US009645228B1

(12) United States Patent
Doerry et al.

(10) Patent No.: US 9,645,228 B1
(45) Date of Patent: May 9, 2017

(54) SHAPING THE SPECTRUM OF RANDOM-PHASE RADAR WAVEFORMS

(71) Applicants: Sandia Corporation, Albuquerque, NM (US); General Atomics Aeronautical Systems, Inc., San Diego, CA (US)

(72) Inventors: Armin W. Doerry, Albuquerque, NM (US); Brandeis Marquette, Escondido, CA (US)

(73) Assignee: Sandia Corporation, Albuquerque, NM (US)

( * ) Notice: Subject to any disclaimer, the term of this patent is extended or adjusted under 35 U.S.C. 154(b) by 819 days.

(21) Appl. No.: 14/102,928

(22) Filed: Dec. 11, 2013

Related U.S. Application Data

(60) Provisional application No. 61/737,416, filed on Dec. 14, 2012.

(51) Int. Cl.
*G01S 7/292* (2006.01)
*G01S 13/28* (2006.01)

(52) U.S. Cl.
CPC ............ *G01S 7/292* (2013.01); *G01S 13/284* (2013.01)

(58) Field of Classification Search
CPC ................................ G01S 7/292; G01S 13/284
USPC .................. 342/90, 108, 111, 116, 128–132, 342/134–135, 145, 189
See application file for complete search history.

(56) References Cited

U.S. PATENT DOCUMENTS

| 4,758,839 | A  | * | 7/1988 | Goebel ................. | G01S 7/4008 342/120 |
| 5,440,311 | A  | * | 8/1995 | Gallagher ............. | G01S 13/522 342/132 |
| 5,731,781 | A  | * | 3/1998 | Reed ..................... | G01S 13/325 342/135 |
| 6,353,406 | B1 | * | 3/2002 | Lanzl ..................... | G01S 13/84 340/10.1 |

(Continued)

FOREIGN PATENT DOCUMENTS

GB     2472623 A  *  2/2011  ............... G01S 7/35

OTHER PUBLICATIONS

S. Axelsson, "Noise Radar Using Random Phase and Frequency Modulation", IEEE Transactions on Geoscience and Remote Sensing, vol. 42, No. 11, pp. 2370-2384 (Nov. 2004).

(Continued)

*Primary Examiner* — John B Sotomayor
(74) *Attorney, Agent, or Firm* — Medley, Behrens & Lewis, LLC

(57) ABSTRACT

The various technologies presented herein relate to generation of a desired waveform profile in the form of a spectrum of apparently random noise (e.g., white noise or colored noise), but with precise spectral characteristics. Hence, a waveform profile that could be readily determined (e.g., by a spoofing system) is effectively obscured. Obscuration is achieved by dividing the waveform into a series of chips, each with an assigned frequency, wherein the sequence of chips are subsequently randomized. Randomization can be a function of the application of a key to the chip sequence. During processing of the echo pulse, a copy of the randomized transmitted pulse is recovered or regenerated against which the received echo is correlated. Hence, with the echo energy range-compressed in this manner, it is possible to generate a radar image with precise impulse response.

20 Claims, 14 Drawing Sheets

(56) References Cited

U.S. PATENT DOCUMENTS

| | | | | |
|---|---|---|---|---|
| 6,608,586 | B1* | 8/2003 | Doerry | G01S 7/023 342/159 |
| 8,035,551 | B1 | 10/2011 | Govoni | |
| 8,860,605 | B2* | 10/2014 | Lellouch | G01S 7/003 342/107 |
| 2004/0070532 | A1* | 4/2004 | Ishii | G01S 13/222 342/134 |
| 2007/0040729 | A1* | 2/2007 | Ohnishi | G01S 7/292 342/93 |
| 2007/0152871 | A1* | 7/2007 | Puglia | G01S 7/352 342/70 |
| 2009/0237292 | A1* | 9/2009 | Tigrek | G01S 13/28 342/109 |
| 2011/0037642 | A1* | 2/2011 | Stove | G01S 7/35 342/128 |
| 2013/0278455 | A1* | 10/2013 | Song | G01S 13/22 342/137 |

OTHER PUBLICATIONS

S. Axelsson, "Analysis of Random Step Frequency Radar and Comparison with Experiments", IEEE Transactions on Geoscience and Remote Sensing, vol. 45, No. 4, pp. 890-904 (Apr. 2007).

S. Axelsson, "Random Noise Radar/Sodar with Ultrawideband Waveforms", IEEE Transactions on Geoscience and Remote Sensing, vol. 45, No. 5, pp. 1099-1114 (May 2007).

K. Lukin, et al., "Stepped-Frequency Noise Radar with Short Switching Time and High Dynamic Range", Radar Symposium (IRS), 11th International—Jun. 16-18, 2010, pp. 1-2, (2010).

X. Gu, et al., "Stepped Frequency Random Noise UWB Radar Signal", Synthetic Aperture Radar (APSAR), 2011 3rd International Asia-Pacific Conference, Sep. 26-30, 2011, pp. 1-4 (2011).

K. Lukin, et al., "L-band Stepped-Frequency Noise SAR on the basis of Arbitrary Waveform Generator", Synthetic Apertur Radar (APSAR), 2011 3rd International Asia-Pacific Conference, Sep. 26-30, 2011, pp. 1-4 (2011).

R. Vela, et al., "A Technique for the Generation of Customizable Ultra-Wideband Pseudo-Noise Waveforms", Radar Sensor Technology XV, Proc. of SPIE vol. 8021, pp. 1-15 (2010).

R. Vela, et al., "Noisy Stepped Frequency (NSF) Waveform in RF Tomography", Radar Sensor Technology XVI, Proc. of SPIE vol. 8361, pp. 1-11 (2012).

A. Doerry, et al., "Generating Nonlinear FM Chirp Waveforms for Radar", Sandia Report SAND2006-5856, Sep. 2006, pp. 1-34.

A. Doerry, et al., "SAR Processing with Non-Linear FM Chirp Waveforms", Sandia Report SAND2006-7729, Dec. 2006, pp. 1-66.

* cited by examiner

US 9,645,228 B1

SHAPING THE SPECTRUM OF RANDOM-PHASE RADAR WAVEFORMS

RELATED APPLICATION

This application claims priority to U.S. Provisional Patent Application No. 61/737,416, filed on Dec. 14, 2012, entitled "SHAPING THE SPECTRUM OF RANDOM-PHASE RADAR WAVEFORMS", the entirety of which is incorporated herein by reference.

STATEMENT OF GOVERNMENTAL INTEREST

This invention was developed under contract DE-AC04-94AL85000 between Sandia Corporation and the U.S. Department of Energy. The U.S. Government has certain rights in this invention.

BACKGROUND

A typical pulse-Doppler radar system emits a series of pulses, and further can collect echo signals. For each pulse, the echo signal(s) is correlated against the transmitted waveform to provide a range sounding, whereby the range soundings are compared against each other across pulses to discern Doppler information. The correlation function may be implemented as an equivalent matched filter, or as a direct correlation.

Radar modes that typically operate in this fashion include Synthetic Aperture Radar (SAR), Inverse-SAR (ISAR), various Moving Target Indicator (MTI) radars, radar systems which are generically range-Doppler radars, coherent search radar systems, etc.

The choice of waveforms to utilize can depend on the objectives of the radar system with respect to ease of waveform generation, downstream processing issues, and desires for probabilities of detection, interception, spoofing, etc. Typically waveforms are required that offer a large time-bandwidth product to afford both high energy and wide bandwidth for improved range resolution. There are a plethora of waveforms from which to choose. These include, but are not limited to, Linear-Frequency-Modulated (LFM) chirp, Non-Linear FM (NLFM) chirp, stepped frequency systems, various phase-coded modulation schemes, and random and pseudo-random noise waveforms. Each has its own advantages and disadvantages.

A conventional radar system employs a final transmit power amplifier that is normally operated in compression to maximize transmitted power output and/or efficiency. However, such operation of the amplifier is non-linear and, accordingly, may not faithfully reproduce amplitude modulations, etc., and further, may act to limit such modulations.

It is well-known to a person having skill in the art that the output of a matched filter, when input with a signal to which it is matched, is the autocorrelation function of the waveform. Furthermore, the autocorrelation function is related by the Fourier Transform (FT) to the Energy Spectral Density (ESD) of the waveform. That is, the autocorrelation function and ESD are FT-pairs. Matched filters have a principal advantage of maximizing the Signal-to-Noise Ratio (SNR) of energy in a final range-Doppler map. Most radar processing seeks to implement matched filters, or at least nearly so.

A problem with matched filters for many waveforms is undesirably high processing sidelobe levels in a range-Doppler map. The high processing sidelobe levels are usually mitigated with additional filtering, often by using data tapering, or window functions, during the processing. Although this may 'un-match' the filter to a degree, which can result in a slight degradation of the range-Doppler map SNR, this tradeoff is usually deemed worthwhile. While the SNR degradation is termed as "slight", it is typically in the 1-2 dB range.

An alternative is to use waveforms designed to exhibit desirable ESD properties, where the autocorrelation of the waveform exhibits desirable, or at least acceptable processing sidelobe levels directly, that is, without additional filtering and the attendant SNR loss.

Various techniques relate to noise radar (radar that uses noise as a transmitted waveform), however, most techniques fail to address issues relating to sidelobe suppression. Where sidelobe suppression is addressed, a conventional technique operates on received data only, by reducing SNR, or operates in a non-linear fashion with resultant adverse effects to some subsequent exploitation schemes. Other techniques relate to shaping the ESD, but typically, such techniques may be limited to specific functions like a Gaussian distribution of frequencies to reduce processing sidelobes in a SAR image.

SUMMARY

The following is a brief summary of subject matter that is described in greater detail herein. This summary is not intended to be limiting as to the scope of the claims.

Various exemplary embodiments presented herein relate to generating a randomized radar pulse waveform. A method is presented comprising determining a waveform spectrum profile, the determining being based on at least one parameter. The method further comprising assigning sample frequencies of the waveform spectrum profile to a set of chips and configuring an order of chips in the set of chips based upon a randomizing key to form a randomized sequence of chips, wherein the method further comprising transmitting a pulse signal having a waveform that is based upon the randomized sequence of chips.

Another exemplary embodiment pertains to a radar system for generating and processing randomized waveforms. The radar system comprises a chip frequency component configured to slice a radar waveform into a plurality of chips, wherein the plurality of chips have an original sequence. The system further comprising a chip randomizer component configured to re-sequence the original sequence of chips into a randomized sequence of chips. The system further comprising a phase accumulator component configured to accumulate frequencies of the randomized sequence of chips to facilitate production of a phase function for each chip in the randomized sequence of chips.

Another exemplary embodiment pertains to a method for utilizing a randomized radar pulse waveform. The method comprises slicing a waveform into an original sequence of chips. The method further comprising obtaining a randomization key and randomizing the sequence of chips with the randomization key to form a transmittable pulse comprising a randomized sequence of chips. The method further comprising transmitting the pulse and receiving an echo pulse, wherein the echo pulse is based at least in part on an interaction of the transmitted pulse and a target. The method further comprising applying the randomization key to re-sequence the randomized sequence of chips into the original chip sequence and generating a radar image based at least in part on comparing an energy of a first chip in the original sequence of chips with an energy of the first chip in the re-sequenced original sequence of chips derived from the echo pulse.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
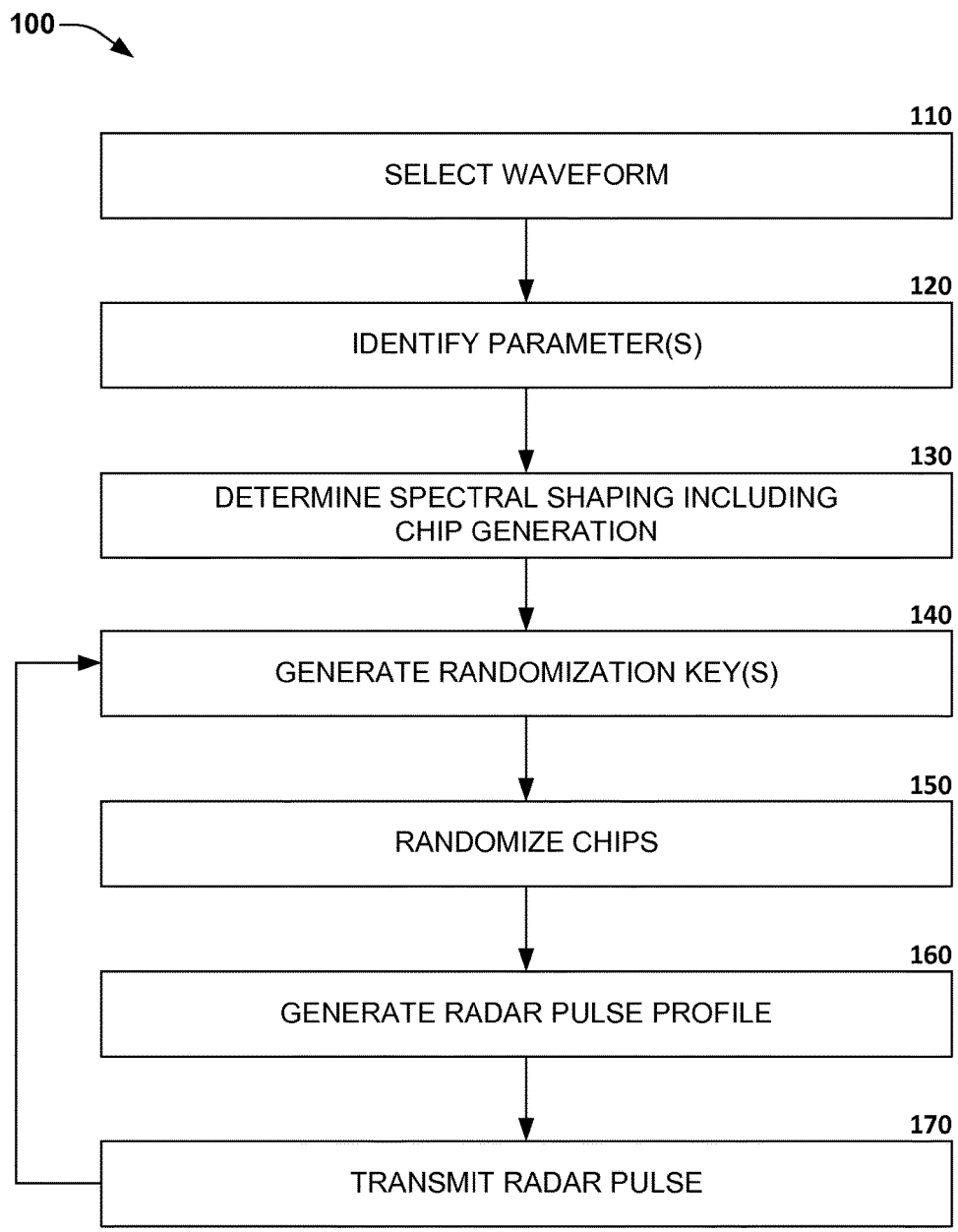
FIG. 1 is a flow diagram illustrating an exemplary methodology for generating a randomized waveform(s).

Various technologies pertaining to randomizing a waveform are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

Further, the term "or" is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. Additionally, as used herein, the term "exemplary" is intended to mean serving as an illustration or example of something, and is not intended to indicate a preference.

The various embodiments presented herein relate to generation of a desired waveform profile in the form of a spectrum of apparently random noise (e.g., white noise or colored noise). Hence, the shape of a waveform profile that can be readily determined (e.g., by a spoofing system) is effectively obscured. The obscuration is achieved by dividing the waveform profile into a sequence of chips (or slices), whereby each chip is a portion of a waveform formed by slicing the waveform into sub-portions as a function of any suitable parameter such as frequency, time, etc. The sequence of chips within a pulse frame can be subsequently randomized. Accordingly, the randomized sequence of chips can appear to be a noise transmission. Randomization can be a function of the application of a factor, key, seed or other randomizing variable(s) to the chip sequence. During decoding of an echo radar pulse (e.g., a reflection off a target of the waveform having the randomized chip sequence) received at the radar system, the received echo signal is compared against a copy of the transmitted waveform having the same randomized chip sequence. Hence, by having knowledge of the specific randomized order of the chips in the transmitted waveform, it is possible to regenerate the same chip sequence for comparison to the received echoes, and furthermore, it is possible to determine any deviation in the reflected pulse from the transmitted waveform and hence identify artifacts (or other target characteristics) in the reflected pulse to facilitate generation of a radar image. While a single, randomized, pulse may appear to comprise of a greater degree of noise compared with the desired waveform, when a plurality of randomized pulses are averaged (e.g., with ensemble averaging), the average tends to replicate the desired waveform properties, in particular the shape of its ESD. For example, the randomization can be applied to a sequence of pulses, with a degree of randomization being introduced based upon the number of pulses in the sequence. Hence, the randomization of the pulses can also be applied collectively such that the randomization is not only applied to a single pulse in isolation, but the randomization is also applied to obtain the desired waveform properties when the randomization of the pulses is averaged by the ensemble average.

It is to be noted that a random-phase signal can have a white spectrum, or it may have a shaped (non-white) spectrum. Further, a sampled-data random-phase signal can have a non-zero ESD over the bandwidth equal to the sampling frequency. Furthermore, a random phase signal can also have random phase differences between two independent random phases. A phase increment across a time increment is a phase-rate, or frequency, while a phase-rate change can be considered a frequency-hop. By controlling the phase-rate (the characteristics of phase increments), it is possible to control the energy spectrum of the random-phase signal. In an aspect, spectrum precision and sharpness can be enhanced by holding a frequency for a given chip length. Hence, when considering digitally generated phase samples, the chip length may require a plurality of samples, which can be considered a time-bandwidth issue. The definition of 'a plurality' can depend on the sharpness desired, but several tens' of samples may be adequate. Accordingly, to facilitate shaping of the ESD of a random-phase signal, control of the average energy at various phase-rates may be required. The ESD shaping can be achieved by controlling the likelihood of specific phase increments, controlling the duration of a specific phase increment chip length, or a combination thereof. For range-Doppler images, the 2-dimensional impulse response (IPR) may be of principal concern. This may tend to average out the random effects of any single pulse.

The various embodiments presented herein facilitate generation of random-phase waveforms which are capable of relatively precise IPR shapes in a range-Doppler map. The capability is achieved by controlling the statistical characteristics of the phase 'increments', or instantaneous frequencies. Further, it is possible to shape the ESD of such a waveform by controlling the instantaneous frequencies themselves, or the durations of the frequency chips, or both. Furthermore, it is possible to shape the ensemble average ESD to match a specified window taper function, thereby precisely providing a desired shape to the IPR, particularly in the mainlobe, in a range-Doppler map. Also, a range-Doppler map or image can tend to average out fluctuations in the ESD of any single pulse. Consequently, the coherent processing interval (CPI) of the random signals can be considered as a whole.

To facilitate understanding of the various embodiments presented herein, various random-phase waveforms are developed and presented (where such random-phase waveforms can be compared with frequency modulated (FM) chirp waveforms that are readily known in the art). Throughout the various examples and embodiments presented herein, and unless otherwise noted, a digitally generated phase with the following radar parameters is utilized as a reference:

$f_s$, sampling frequency, =1 GHz;
$B_T$, waveform bandwidth (desired)=500 MHz;
T, pulse width=10.24 µs;
N, number of pulses=1024;

where, a sampling frequency, $f_s$, can be a function of a limitation of one or more hardware components utilized during generation of a waveform; the waveform bandwidth, $B_T$, can be calculated based upon a required range resolution of a radar system; the pulse-width, T, can be chosen to meet timing requirements for the ranges of interest to prevent occlusion, and the number of pulses, N, can be calculated to facilitate achieving Doppler resolution requirements and/or SNR requirements. It is to be appreciated that while the various embodiments are presented herein, each is based on analyses respectively comprising N=1024 pulsed waveforms, the according ensemble averages include according artifacts (e.g., lack of a fully smoothed average waveform) which may not be present in systems using a greater number of pulsed waveforms. For example, a SAR image may be formed from 10,000-100,000 pulses, and accordingly the ensemble average will likely be much smoother with the low level artifact of a jagged waveform being smoothed out by averaging over a much larger number of pulses.

Additional parameters that can be defined are:
b, fractional bandwidth=$B_T/f_s$;
$T_s$, sample spacing or period within pulse=$1/f_s$;
I, number of sample periods within pulse=$T/T_s$.

In an aspect, the various embodiments presented herein can be utilized by a pulse-Doppler system, e.g., a Synthetic Aperture Radar (SAR)-based system. Further, the various examples and embodiments presented herein can be directed towards an IPR sidelobe mitigation technique, for example, at a level consistent with a −35 dB Taylor weighting ($\bar{n}$=4). Such an IPR shape is common for SAR. It is to be appreciated that any other characteristic may be chosen, e.g., for another mode of operation. Further, to facilitate understanding, the following presumes no system noise exists in the generated or processed waveforms, hence, any uncertainty in a waveform is purely a function of the waveform, and not of measurement.

Figure 2:
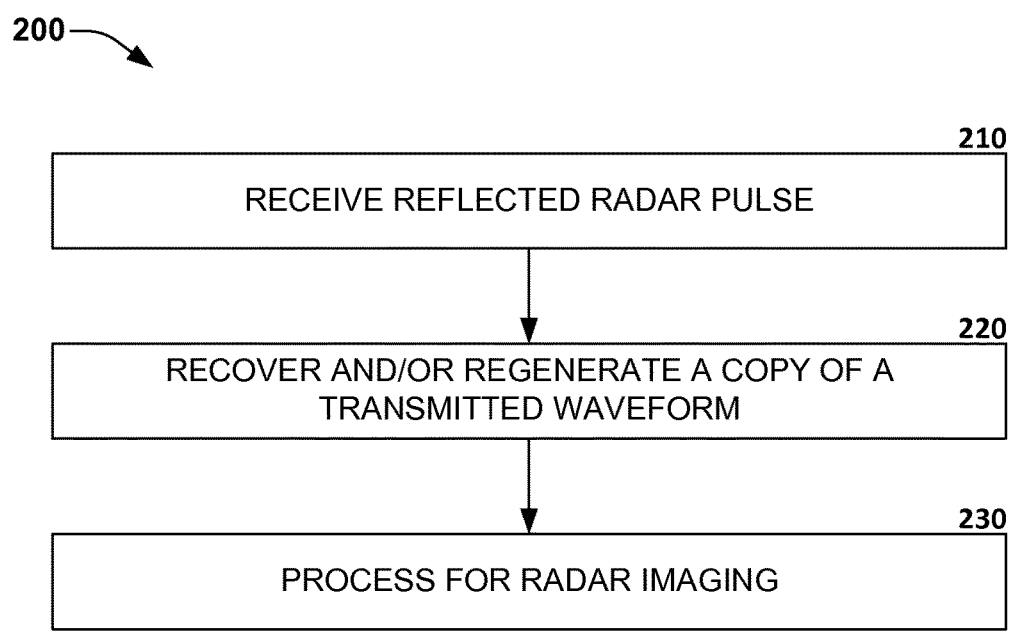
FIG. 2 is a flow diagram illustrating an exemplary methodology for processing a randomized waveform(s).

FIGS. 1 and 2 are exemplary methodologies relating to generating a plurality of waveforms having randomized configurations. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement the methodologies described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodology can be stored in a computer-readable medium, displayed on a display device, and/or the like.

FIG. 1 illustrates an exemplary methodology 100 for generating a plurality of radar pulses having randomized configurations. At 110, a required waveform profile (or schema) for the plurality of pulses can be selected. In a non-exhaustive list, the waveform can be chosen from any of a LFM chirp, a NLFM chirp, a stepped frequency profile, a phase-coded modulation profile, a random noise waveform, a pseudo-random noise waveform, etc. For example, a consideration during choice of a waveform is a waveform having a desired energy spectral density.

At 120, the various parameters for transmission of a signal having the waveform can be identified. Such parameters can include what the sidelobe levels are, what window function to utilize, etc. In an embodiment, a window function can be utilized that minimizes mainlobe width while maintaining a peak sidelobe constraint, where such window functions can include a Taylor window, a Dolph-Tschebysheff window, a Hamming window, a Gaussian-based window, etc. For example, a Taylor window can approximate a Dolph-Tschebysheff window near its mainlobe, but unlike the Dolph-Tschebysheff window, a Taylor window can allow sidelobes to decay at a rate of 1/f beyond some distance from the mainlobe. Sidelobe levels and the point beyond which sidelobes roll off are effectively parameters to the Taylor window. In the various embodiments presented herein, a −35 dB Taylor window ($\bar{n}=4$) is utilized.

At 130, the spectral shaping for the desired waveform can be defined, whereby sample frequencies of the desired waveform spectrum profile can be assigned to a set of chips. Spectral shaping can include a number of parameters including frequency, frequency range, frequency distribution, etc. In an embodiment, the frequency range of the waveform can be divided (or sliced) into a number (or plurality) of chips (which may also be referred to as slices), whereby the chips can form a sequence across the frequency range. For chirp waveforms, these chips can also form a sequence across the time duration of the pulse. In an aspect, the sequence of chips at this stage can be considered to be an original chip sequence, while the later referenced randomized sequence of chips can be considered to be a randomized chip sequence of the original chip sequence. In an embodiment, the chips can be of a constant frequency increment across a particular band, while in another embodiment, the chips can be of a non-constant frequency increment across a particular band, etc. In an embodiment, based upon the chosen frequency distribution, the frequency distribution with non-constant increments in frequency (e.g., a non-constant frequency spacing for the sequence of chips) can generate the required spectral shaping (e.g. required waveform). In another embodiment, where a constant increment in frequency is utilized then the required spectral shaping can be obtained as a function of adjusting a duration of a chip, adjusting a probability of selection of a chip of a particular frequency, or a combination of both, to facilitate obtaining a required energy for that particular chip, and accordingly, the required spectral shaping. In another embodiment, a duration for transmission of each individual chip can be configured to facilitate attaining the desired spectral shaping. Hence, by determining a frequency for a chip, and also a duration of transmission at the chip frequency, a spectral shaping can be achieved where a first chip, at a first frequency, is transmitted for a first duration (e.g., to obtain a low magnitude or energy at the first frequency), while a second chip, at a second frequency, is transmitted for a second duration where the second duration can exceed the first duration (e.g., to obtain a high magnitude or energy at the second frequency relative to the first frequency).

At 140, a randomization key can be generated. The randomization key can be generated in real-time (e.g., on-the-fly) or the randomization key can be retrieved from a look-up table (e.g., retrieved from a data store) comprising a plurality of randomization keys to achieve the desired randomization (e.g., to achieve a desired result of ensemble averaging). In an aspect, the randomization key can be generated as a function of a seed value being applied to an algorithm in a pseudo-random number generator, whereby the algorithm can be constrained to achieve the desired chip randomization (e.g., constrained to a number of chips) and the output of the pseudo-random number generator is a key (or pseudo-random code) to be applied to the original sequence of the plurality of chips.

At 150, the sequence of the plurality of chips (e.g., defined for the set of frequencies for a given duration) can be randomized based upon application of the randomization key to the original, sequentially defined plurality of chips. The randomization operation can form a randomized sequence of chips.

At 160, the sequence of randomized chips can be compiled to generate and/or form a waveform that appears to be comprised of random noise. Such a waveform can be referred to as a radar pulse profile.

At 170, a radar pulse signal having the radar pulse profile can be transmitted, whereupon, the flow can return to 140 where the next randomization key can be generated and another pulse comprising the randomized sequence of chips can be transmitted.

FIG. 2 illustrates an exemplary methodology 200 for processing a plurality of received radar pulses having randomized configurations (radar pulse profiles generated in accordance with acts 140, 150, and 160 of the methodology 100). At 210, a reflected radar pulse (e.g., an echo pulse) is received from a target area, the reflected radar pulse corresponding to an interaction between a transmitted radar pulse and a target. As previously described, the transmitted radar pulse can be formed based upon a radar pulse profile, which has been generated by randomizing a sequence of chips extracted from a desired waveform shape through utilization of a particular randomization key. The randomized sequence of chips can cause the transmitted radar pulse (and thus the reflected radar pulse) to have a random nature similar to noise. It is to be noted that a waveform, when plotted as a function of time, can have random phase like noise, but may not have random amplitude (e.g., as a function of time) as some noise does. It is to be appreciated that the term 'noise' is a generic term and can relate to any of an undesirable signal, an undesirable signal having a random nature, a signal comprising noise (e.g. ADC quantization noise) which has a random amplitude, a noise which has random amplitude and phase, a noise which has a random phase, etc. As is known in the art, power amplifiers can destroy any amplitude characteristics associated with a transmitted signal, and accordingly, the various embodiments presented herein can be directed towards addressing amplitude issues by adjustment of phase and/or frequency.

At 220, a copy of the transmitted waveform is recovered and/or regenerated that exhibits the same randomized order in its sequence of chips, thereby serving as a reference waveform for the subsequent processing of the reflected radar pulse.

At 230, based upon the recovered and/or regenerated copy of the randomized sequence of chips in transmitted pulse, the radar received echo pulse can be processed to facilitate detection of a target(s), etc. For example, an energy of a first chip in the randomized sequence of chips can be compared with an energy of the first chip in the received chips (which matches the transmitted sequence of chips) derived from the reflected (echo) radar pulse, an energy of a second chip in the randomized sequence of chips can be compared with an energy of the second chip in the received chips, and so on. Based at least in part on the comparison between a transmitted pulse and an echo pulse, at least one characteristic of the target can be determined, e.g., a difference in energy between the first chip in the randomized sequence of chips and the first chip in the received chips, a difference in energy between the second chip in the randomized sequence of chips and the second chip in the received chips, etc. Acts 210-230 can be performed for multiple radar pulses (and thus multiple chip sequences), and the difference in energies across all the chip sequences can be utilized to generate a radar image.

Figure 3:
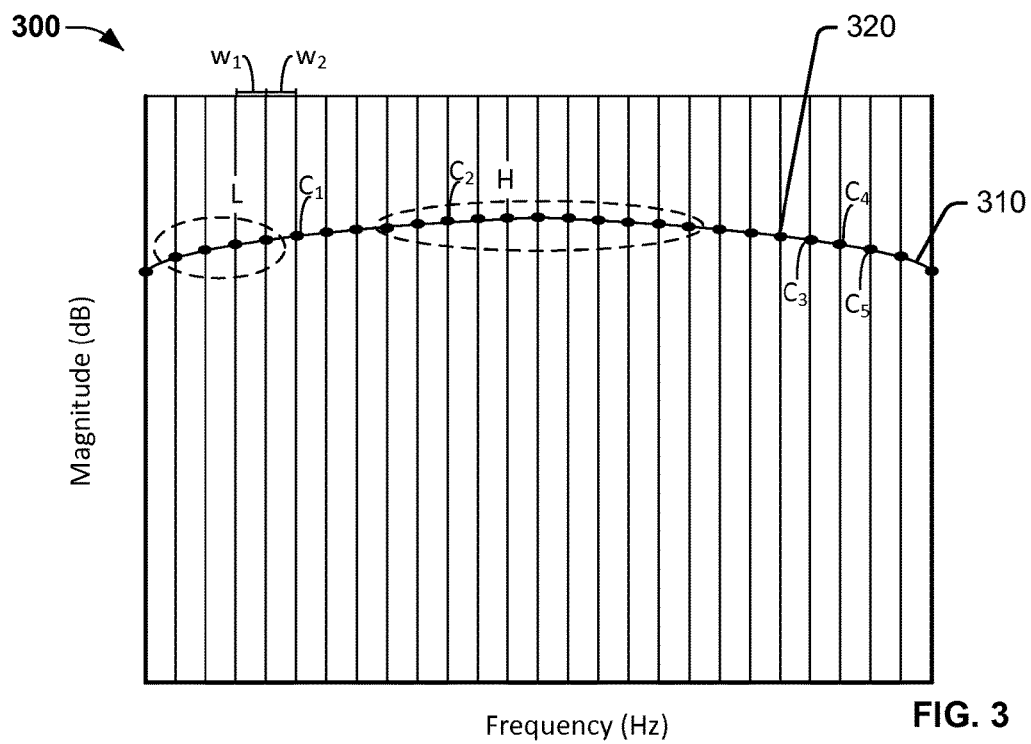
FIG. 3 illustrates a schematic of sliced waveform, according to an embodiment.

FIG. 3 presents a schematic of the desired ESD of a waveform that is to be randomized, in accord with an embodiment. As shown, a ESD 310 can be sampled into a plurality of individual frequencies 320, wherein the spacing between neighboring sample frequencies can be of the same width (e.g., frequency spacing $w_1=w_2$) or of a disparate width (e.g., frequency spacing $w_1<w_2$ or frequency spacing $w_1>w_2$). In another embodiment, a frequency sample spacing of a first pair of frequency samples (e.g., $C_3$-$C_4$) in the energy spectrum of a waveform can be equal to the frequency sample spacing of a second pair of frequency samples (e.g., $C_4$-$C_5$) in the energy spectrum of a waveform. In a further embodiment, the frequency sample spacing of a first pair of frequency samples (e.g., $C_3$-$C_4$) in the energy spectrum of a waveform can be disparate to a second pair of frequency samples (e.g., $C_4$-$C_5$) in the energy spectrum of a waveform.

Figure 4:
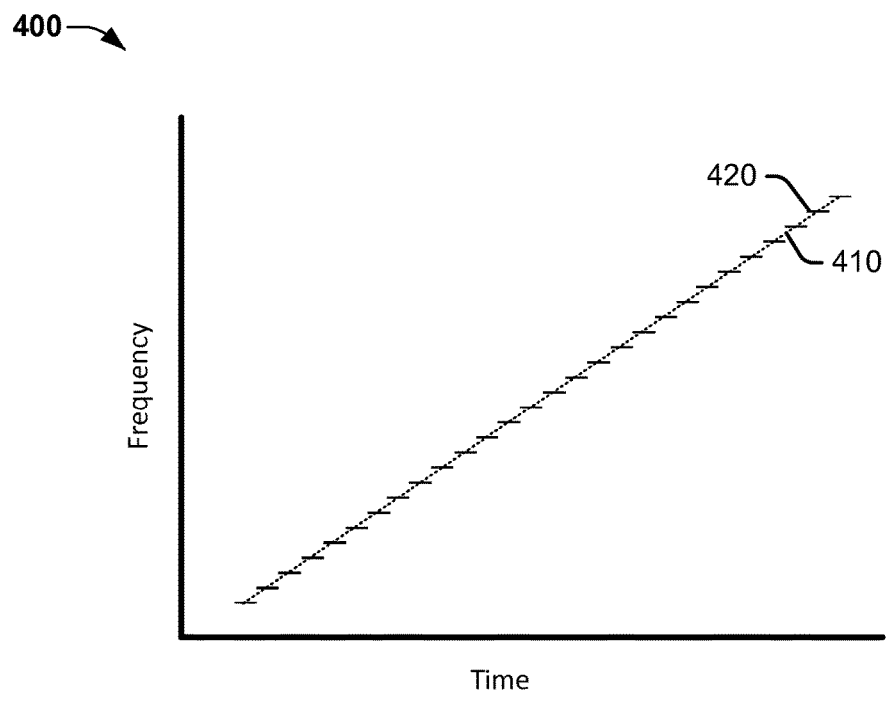
FIG. 4 illustrates a schematic of a series of chips prior to being randomized, according to an embodiment.
Figure 5:
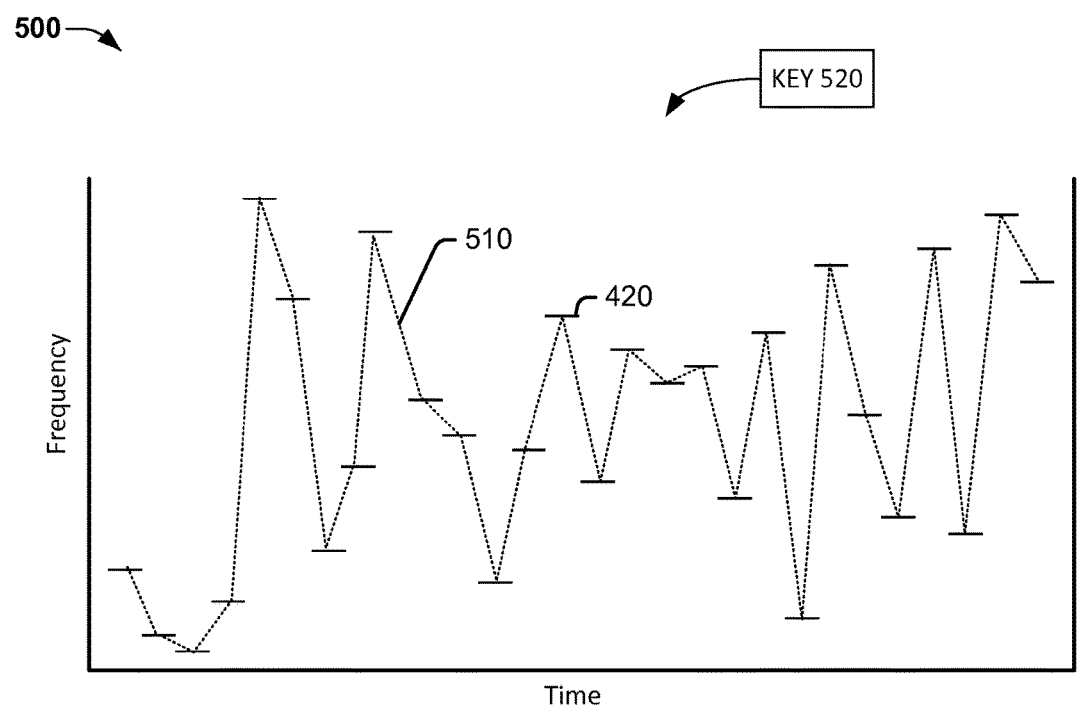
FIG. 5 illustrates a schematic of a 'noisy' waveform being formed from a randomized waveform, according to an embodiment.

As shown in FIG. 4, a conventional stepped-frequency chirp waveform 410 can be constructed by sequencing across the plurality of frequencies 420 that form the ESD 310 in a monotonic direction, whereby each frequency can be held for some duration, e.g., its chip length. Further, as shown in FIG. 3, the spectral energy magnitude can be varied for each sample or chip frequency. For example, chip frequency $C_1$ can have a shorter transmission duration (or other energy effecting operation) than chip frequency $C_2$, thereby enabling a difference in energy between chip frequency $C_1$ and chip frequency $C_2$. Further, as shown in FIG. 5, a randomization key 520 can be obtained (e.g., from a pseudo-random number generator or from a database), and applied to facilitate re-ordering of the sequence of chips shown in FIG. 4 (from the original stepped frequency waveform 410) to a pseudo-randomized sequence 500. A waveform 510 generated from the randomized frequency chips of FIG. 5 can be a radar pulse profile. A signal having the radar pulse profile (e.g., of waveform 510) can be transmitted and appears to be noise, but still retains the essential ESD characteristics of FIG. 3. It is to be appreciated that the lengths of the respective randomized portions 420 are likely much greater than the length of the randomized portions which would be generated in a real application. For example, to illustrate the various concepts presented herein, waveform ESD 310 has been sampled into approximately 27 chip frequencies, however, in a real world scenario the number of chip frequencies can be much greater, e.g., about 600 samples. Accordingly, as shown in FIG. 5, the randomized waveform 510 can be formed based on identifying a sample frequency for each randomized time chip 420, and then generating the waveform 510 based upon sequentially moving from a frequency (e.g., a sample frequency) of a first randomized time chip to a frequency (e.g., a sample frequency) of a second randomized time chip.

As previously mentioned, a signal having the waveform 510 (or a close approximation thereto) can be transmitted by a radar system, reflected off of a target (e.g., a landscape, building, vehicle, etc.), and subsequently received at the radar system. At the radar system, the randomization key 520 can be obtained (e.g., by re-application of a seed value to the pseudo-random number generator or retrieved from a data store), and values output thereby can be utilized to reconstruct the original sequence of chips (e.g., the transmitted waveform can be recovered, regenerated, or otherwise reconstructed). This transmitted waveform copy then serves as a reference signal or kernel for matched filter processing of the received echo signals. Based upon a deviation of the received echo waveform in comparison with the transmitted waveform 510, a radar image can be formed (e.g., based in part on a variation in energy between the received echo waveform in comparison with the transmitted waveform 510). Since essential characteristics of the ESD 310 are unaffected by the random order of the sample frequencies (i.e. chips), the IPR of the matched filter output is essentially unaffected. The pulse averaging afforded by Doppler processing of multiple pulses (or related pulse-averaging techniques) serves to additionally reduce anomalies due to the random nature of the waveforms.

To facilitate understanding of the various concepts presented herein, a number of waveforms are presented. In an aspect, the series of waveforms can comprise a phase having a random nature, and accordingly, the waveforms can have a frequency that is, to a degree, also random. As is known in the art, the phase is the integral over time of the frequency. The instantaneous frequency is the time-rate of change of phase, whereby, in a sampled data system, the instantaneous frequency is the phase increment per sample time. Thus, it is possible to shape the spectrum of a pulse waveform by manipulating the statistics of randomness relating to the phase, frequency, etc. A form of the phase expression in terms of an accumulated instantaneous frequency, can be expressed as:

$$\Phi(i,n) = \phi_n + \sum_{i'=-I/2}^{i} \Omega(i',n) \qquad \text{Eqn. 1}$$

where the component parameters can be defined, as pulse index $n=-N/2 \leq n < N/2$, waveform sample index $i=-I/2 \leq i < I/2$, $\phi_n$ is the reference phase for the $n^{th}$ pulse, and $\Omega(i,n)$ is an instantaneous frequency function. The difference between various waveforms can be in the nature of $\Omega(i,n)$. Generally, $\Omega(i,n)$ can be centered on a reference frequency, and exhibit a random offset, where the instantaneous frequency of the waveform can have the form:

$$\Omega(i,n) = \omega_n T_s + \Delta\omega_{n,i} T_s \qquad \text{Eqn. 2}$$

where $\omega_n$ is the reference frequency for an $n^{th}$ pulse, and $\Delta\omega_{n,i}$ is the frequency offset for the $i^{th}$ sample of the $n^{th}$ pulse. The various parameters can be additionally modulated on a pulse to pulse basis to provide motion compensation. In addition, $\phi_n$ may be additionally modulated to provide other benefits, e.g., ambiguous range mitigation, etc.

Figure 6:
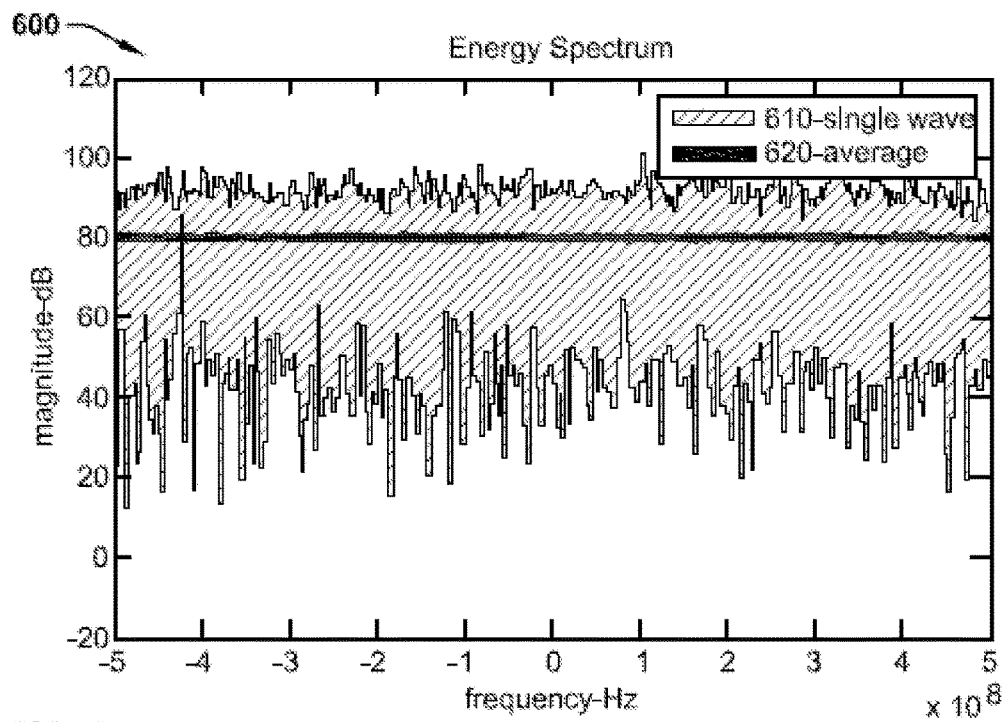
FIG. 6 illustrates an energy spectrum plot of a single pulse and an average energy spectrum for a waveform having a random phase, according to an embodiment.
Figure 7:
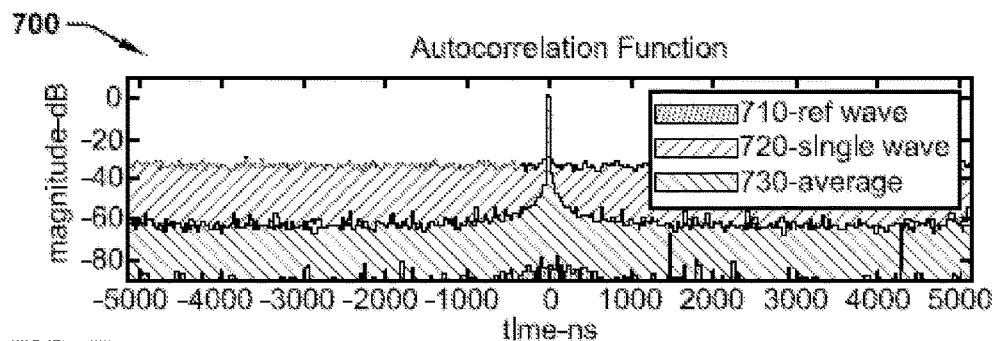
FIG. 7 presents an autocorrelation function of an energy spectrum formed with a random phase, according to an embodiment.
Figure 8:
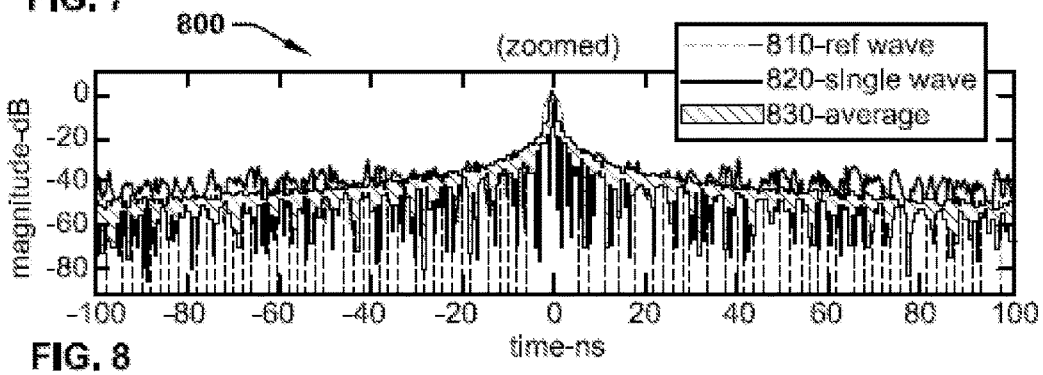
FIG. 8 illustrates a zoomed version of the central region of FIG. 7.

A waveform having a random phase and random frequency can be defined according to:

$$\Omega(i,n) = 2\pi(X_u(i,n) - 0.5) \quad \text{Eqn. 3}$$

where $X_u(i,n)$ is the uniformly distributed random value over the interval (0,1). In the example, $X_u(i,n)$ is a different random selection for each index i and n. FIG. 6 presents the energy spectrum 610 of both a single pulse, and the average energy spectrum 620 for a plurality of N pulses for a waveform having a random phase energy spectrum. FIG. 7 presents an autocorrelation function of the energy spectrum formed with a random phase, while FIG. 8 illustrates a zoomed version of the central region of FIG. 7. For comparison, a Taylor window for a desired compressed pulse response, where the reference function is a −35 dB Taylor window with $\bar{n}=4$, is also evident in FIG. 8. In FIG. 7, plot 710 is the reference (or ideal) waveform, plot 720 is the plot for a single waveform, and plot 730 is the ensemble average of a plurality of waveforms, while in FIG. 8, plot 810 is the reference (or ideal) waveform, plot 820 is the plot for a single waveform, and plot 830 is the ensemble average of a plurality of waveforms. In the embodiment presented herein, the ensemble average of plots 730 and 830 is of 1024 pulsed waveforms. As is readily apparent, the ESD is essentially flat, and further to be noted, the sidelobes diminish with ensemble averaging.

Figure 9:
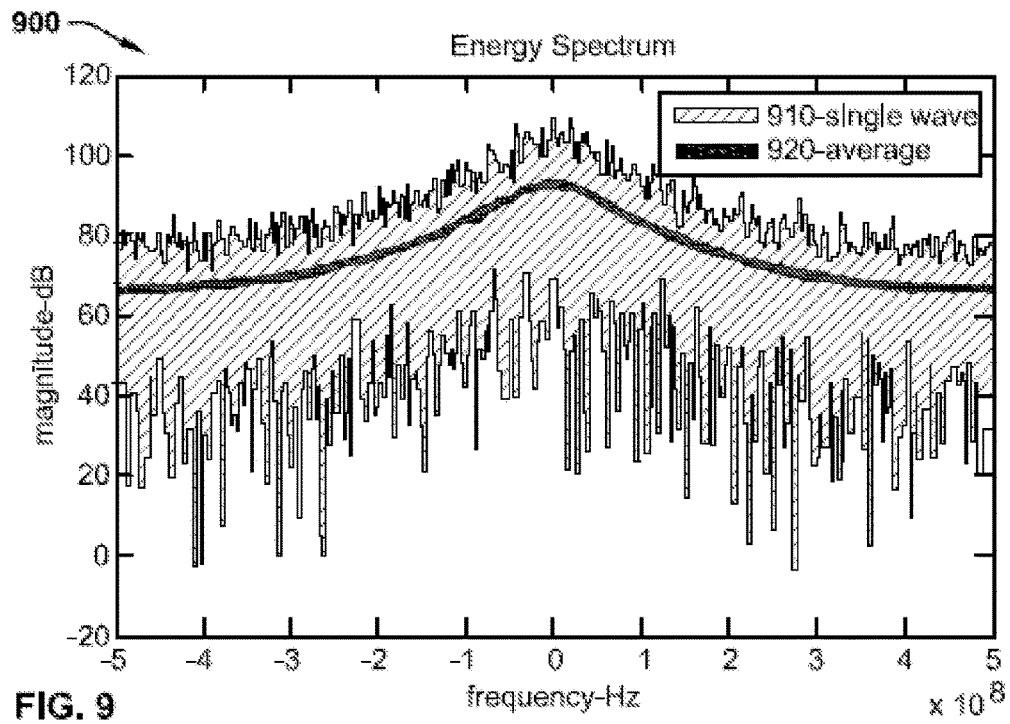
FIG. 9 illustrates an energy spectrum plot of a single pulse and an average energy spectrum for a waveform having a random phase, according to an embodiment.
Figure 10:
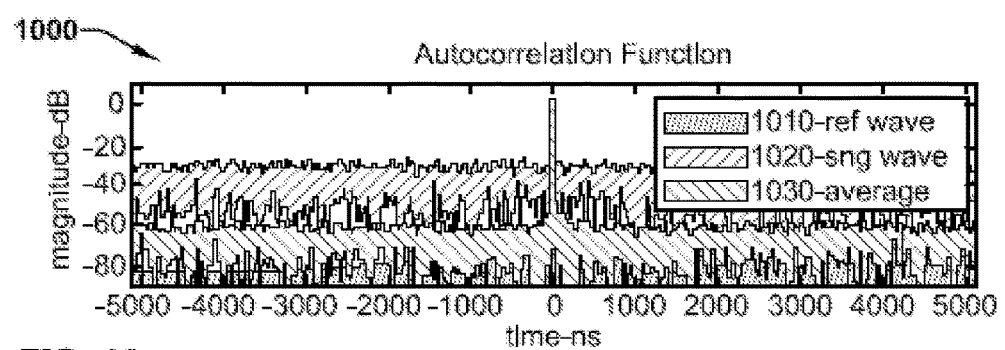
FIG. 10 presents an autocorrelation function of an energy spectrum formed with a random phase, according to an embodiment.
Figure 11:
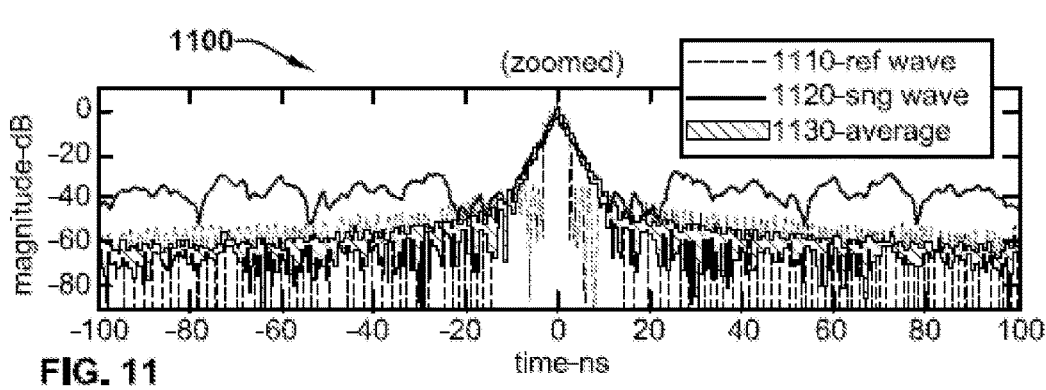
FIG. 11 illustrates a zoomed version of the central region of FIG. 10.

Further, the frequency increments can be limited by setting:

$$\Omega(i,n) = 2\pi b(X_u(i,n) - 0.5) \quad \text{Eqn. 4}$$

which can result in an alteration of the ESD and associated autocorrelation function, depending on fractional bandwidth factor b. In the examples, b=0.5. FIG. 9 presents the energy spectrum 910 of a single pulse, and the average energy spectrum 920 for a plurality of N pulses for an energy spectrum formed with limited random phase. FIG. 10 presents an autocorrelation function of the energy spectrum formed with limited random phase, while FIG. 11 illustrates a zoomed version of the central region of FIG. 10. For comparison, a Taylor window for a desired compressed pulse response, where the reference function is a −35 dB Taylor window with $\bar{n}=4$, is also evident in FIG. 11. In FIG. 10, plot 1010 is the reference (or ideal) waveform, plot 1020 is the plot for a single waveform, and plot 1030 is the ensemble average of a plurality of waveforms, while in FIG. 11, plot 1110 is the reference (or ideal) waveform, plot 1120 is the plot for a single waveform, and plot 1130 is the ensemble average of a plurality of waveforms. In the embodiment presented herein, the ensemble average of plots 1030 and 1130 is of 1024 pulsed waveforms. In comparison with FIGS. 6-8, FIGS. 9-11 indicate a sidelobe reduction and mainlobe broadening. It is to be noted that it can be difficult to define an edge to the ESD to readily identify the waveform bandwidth. In other words, there is a degree of 'spillage' outside the band of interest. The spillage can be due to the frequency being allowed to change over its entire interval for each increment in index i. To sharpen the edges, more correlation from sample to sample may be required. In accordance with the previously described methodology, a way to achieve the sharpening is with the concept of a 'chip' (e.g., any of chips 420), where the frequency may randomly jump only at chip boundaries where a chip is some number of individual samples. The sharpness of the band edges then becomes a time-bandwidth issue for the chip. However, as shown in FIGS. 9-11, the ESD is beginning to be shaped.

The edges of the spectrum may be sharpened by allowing frequency changes only at chip edge boundaries. This can be modeled as:

$$\Omega(i,n) = 2\pi b(X_u(f(i),n) - 0.5) \quad \text{Eqn. 5}$$

where $$f(i) = \tau_{step}\text{floor}(i/\tau_{step}) \quad \text{Eqn. 6}$$

Figure 12:
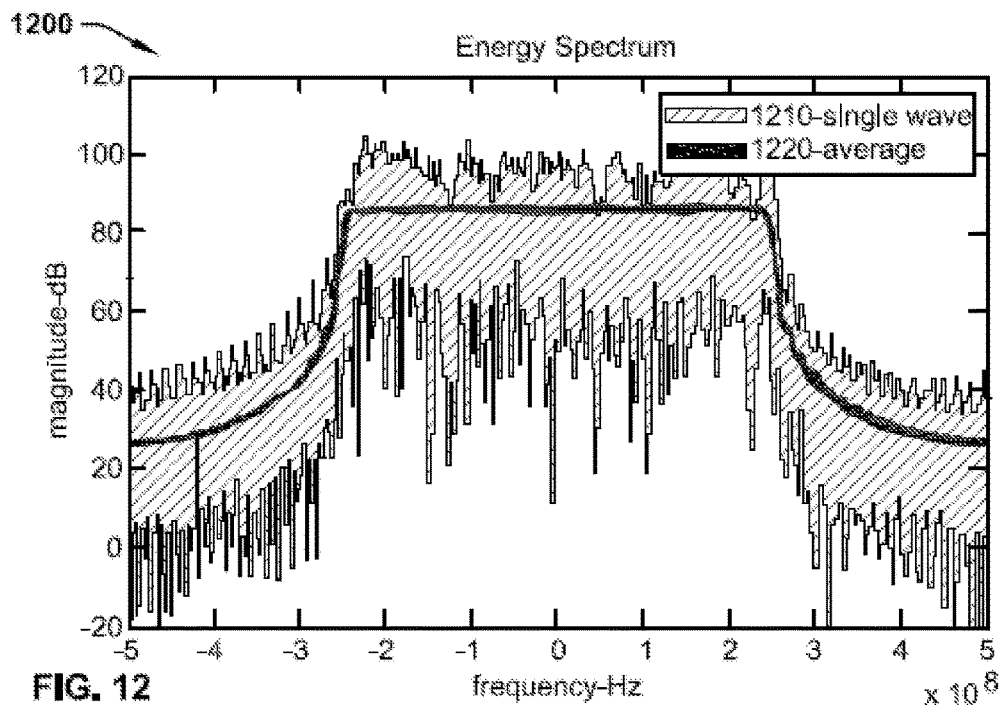
FIG. 12 illustrates an energy spectrum plot of a single pulse and an average energy spectrum for a waveform created from random frequency chips, according to an embodiment.
Figure 13:
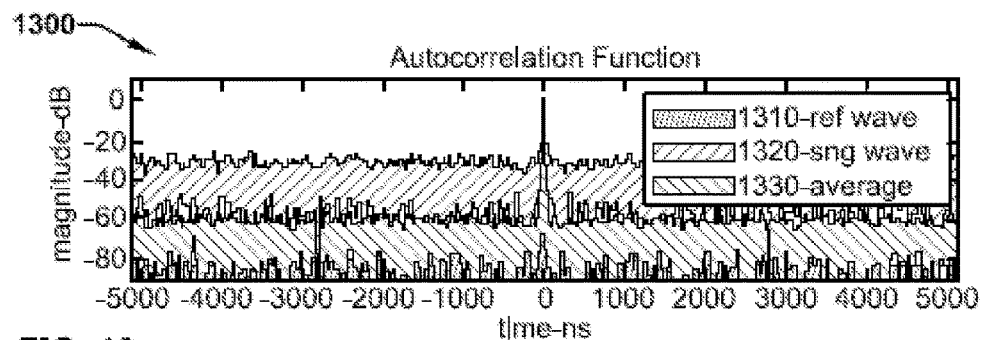
FIG. 13 presents an autocorrelation function of an energy spectrum formed with random frequency chips, according to an embodiment.
Figure 14:
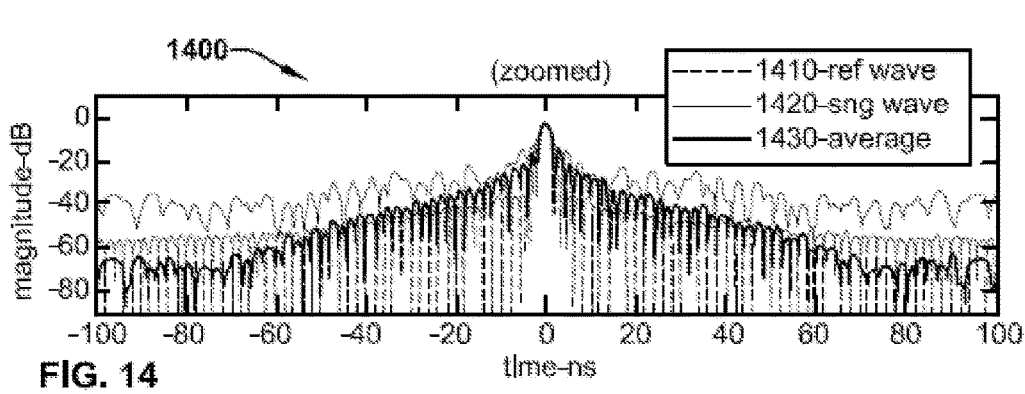
FIG. 14 illustrates a zoomed version of the central region of FIG. 13.

Such an approach can be viewed as a frequency-hopping spread-spectrum technique. Application of the technique can lead to sharpening of the edges of the ESD and thereby shape the associated autocorrelation function accordingly, depending on fractional bandwidth factor b. For example, b=0.5. FIG. 12 illustrates the energy spectrum 1210 of a single pulse, and the average energy spectrum 1220 for a plurality of N pulses for a waveform generated with random frequency chips. It is to be noted that the ensemble average energy spectrum 1220 is smoother than the curve for the single pulse 1210. FIG. 13 presents the autocorrelation function of the energy spectrum formed with random frequency chips, while FIG. 14 illustrates a zoomed version of the central region of FIG. 13. For comparison, a Taylor window for a desired compressed pulse response, where the reference function is a −35 dB Taylor window with $\bar{n}=4$, is also evident in FIG. 14. In FIG. 13, plot 1310 is the reference (or ideal) waveform, plot 1320 is the plot for a single waveform, and plot 1330 is the ensemble average of a plurality of waveforms, while in FIG. 14, plot 1410 is the reference (or ideal) waveform, plot 1420 is the plot for a single waveform, and plot 1430 is the ensemble average of a plurality of waveforms. In the embodiment presented herein, the ensemble average of plots 1330 and 1430 is of 1024 pulsed waveforms. It is to be noted that the autocorrelation function depicted in FIGS. 13 and 14 has a sin c nature with attendant undesirable high sidelobes.

Spectrum shaping may be further achieved by altering the statistics of the selected random values. Hence, the instantaneous frequency function can be modeled as:

$$\Omega(i,n) = 2\pi b(X_w(f(i),n) - 0.5) \quad \text{Eqn. 7}$$

where $X_w(i,n)$ is the shaped-distribution random value over the interval (0,1).

Accordingly, $X_w(i,n)$ can have a Probability Density Function (PDF) with the same shape as the desired window taper function for the ESD. For example, the window can be a −35 dB Taylor window with $\bar{n}=4$.

Figure 15:
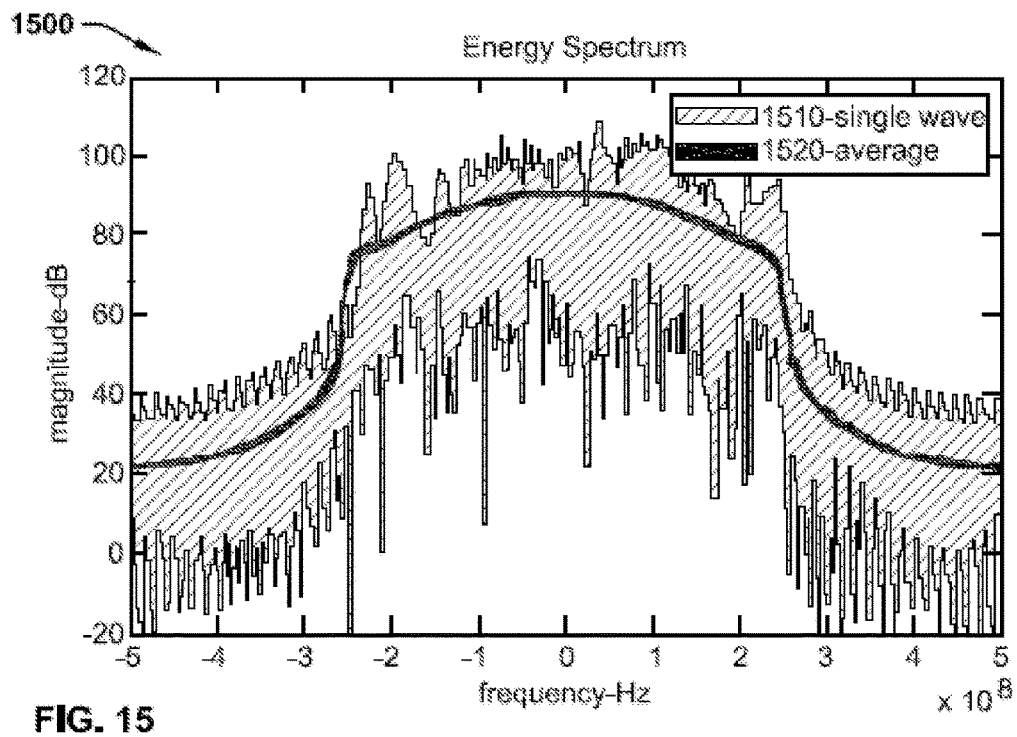
FIG. 15 illustrates an energy spectrum plot of a single pulse and an average energy spectrum for a shaped energy spectrum formed with random frequency chips, according to an embodiment.
Figure 16:
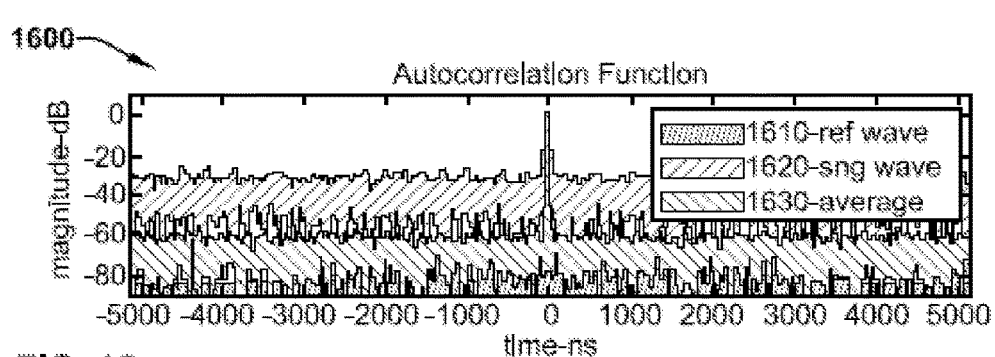
FIG. 16 presents an autocorrelation function of a shaped energy spectrum formed with random frequency chips, according to an embodiment.
Figure 17:
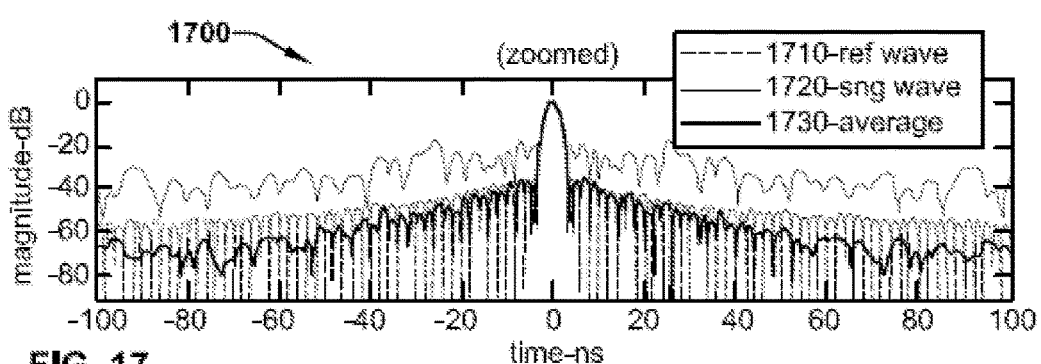
FIG. 17 illustrates a zoomed version of the central region of FIG. 16.

FIG. 15 illustrates the energy spectrum 1510 of a single pulse, and the average energy spectrum 1520 for a plurality of N pulses for a shaped spectrum with random frequency chips. It is to be noted that the ensemble average energy spectrum 1520 is smoother than the curve for the single pulse 1510. FIG. 16 presents an autocorrelation function of a shaped energy spectrum formed with random frequency chips, while FIG. 17 illustrates a zoomed version of the central region of FIG. 16. For comparison, a Taylor window of a desired compressed pulse response, where the reference function is a −35 dB Taylor window with $\bar{n}=4$, is also evident in FIG. 17. In FIG. 16, plot 1610 is the reference (or ideal) waveform, plot 1620 is the plot for a single waveform, and plot 1630 is the ensemble average of a plurality of waveforms, while in FIG. 17, plot 1710 is the reference (or ideal) waveform, plot 1720 is the plot for a single waveform, and plot 1730 is the ensemble average of a plurality of waveforms. In the embodiment presented herein, the ensemble average of plots 1630 and 1730 is of 1024 pulsed waveforms. It is to be noted that the waveform and the desired waveform match well, particularly in the region of the mainlobe, which demonstrates the ability to shape a random signal's ESD to achieve a desired IPR.

In the preceding examples, the random frequencies were selected from within the continuum of the passband. However, the frequencies can be limited to a finite set that are uniformly arrayed within the passband. Although the frequencies themselves are quantized to a linear spacing, the likelihood of selecting a particular frequency is still adjusted to shape the spectrum. The instantaneous frequency function can be modeled accordingly as:

$$\Omega(i,n) = 2\pi b(g\{X_w(f(i),n)\} - 0.5) \qquad \text{Eqn. 8}$$

where the quantization function is presumed to allow the same number K steps as there are individual chips, that is:

$$g\{x\} = \frac{\text{floor }(xK)}{K} \qquad \text{Eqn. 9}$$

with $X_w(i,n)$=shaped distribution random value over the interval [0,1), and $f(i)=\tau_{step}\text{floor}(i/\tau_{step})$. For the presented examples, b=0.5, K=160, and the spectral weighting shape is a −35 dB Taylor window with $\bar{n}$=4.

Figure 18:
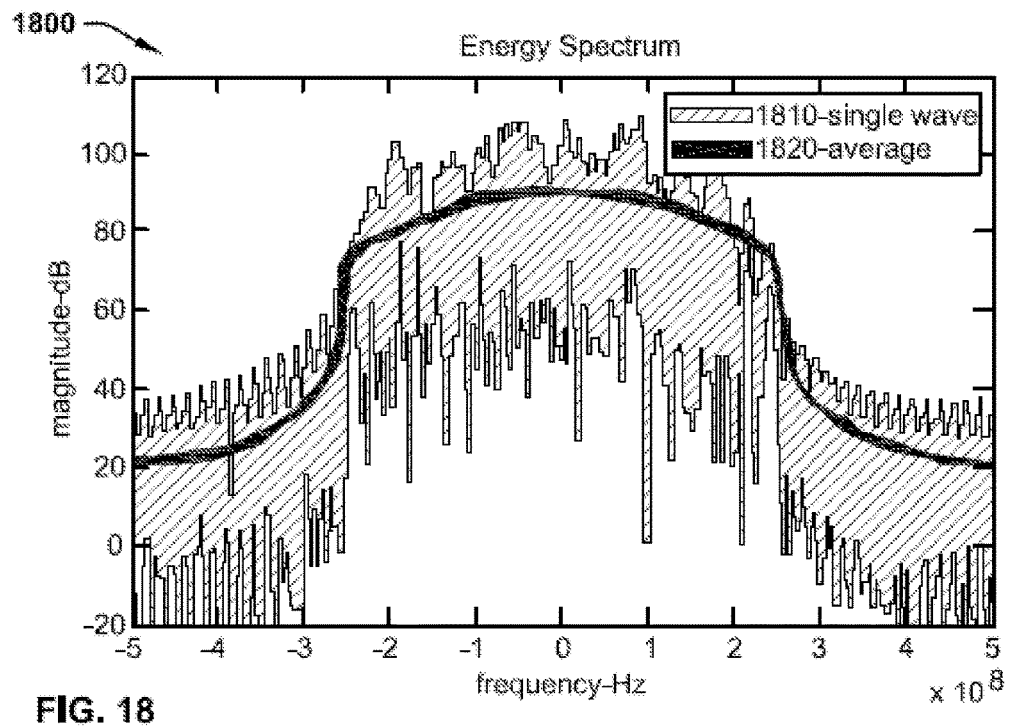
FIG. 18 illustrates an energy spectrum plot of a single pulse and an average energy spectrum formed with quantized random frequency chips, according to an embodiment.
Figure 19:
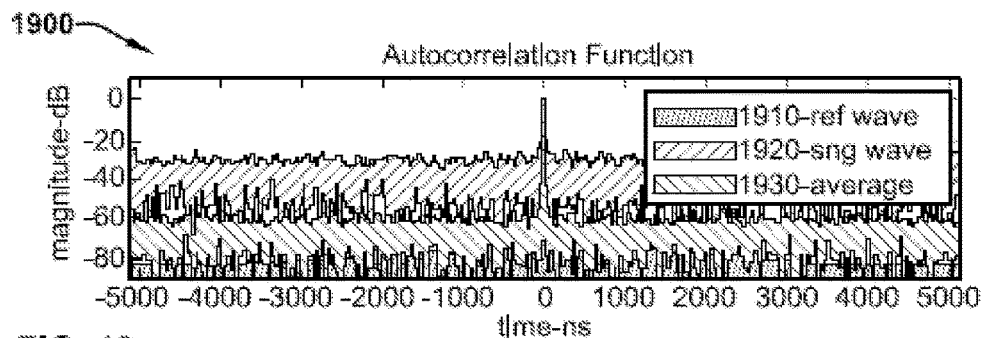
FIG. 19 presents an autocorrelation function of an energy spectrum formed with quantized random frequency chips, according to an embodiment.
Figure 20:
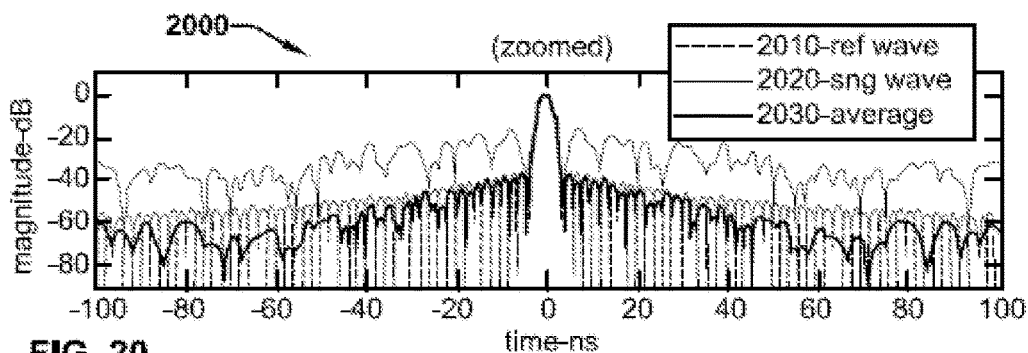
FIG. 20 illustrates a zoomed version of the central region of FIG. 19.

FIG. 18 illustrates the energy spectrum 1810 of a single pulse, and the average energy spectrum 1820 for a plurality of N pulses for a shaped spectrum utilizing a quantized random frequency chip energy spectrum. It is to be noted that the ensemble average energy spectrum 1820 is smoother than the curve for the single pulse 1810. FIG. 19 presents the autocorrelation function of an energy spectrum formed with quantized random frequency chips, while FIG. 20 illustrates a zoomed version of the central region of FIG. 19. For comparison, a Taylor window for a desired compressed pulse response, where the reference function is a −35 dB Taylor window with $\bar{n}$=4, is also evident in FIG. 20. In FIG. 19, plot 1910 is the reference (or ideal) waveform, plot 1920 is the plot for a single waveform, and plot 1930 is the ensemble average of a plurality of waveforms, while in FIG. 20, plot 2010 is the reference (or ideal) waveform, plot 2020 is the plot for a single waveform, and plot 2030 is the ensemble average of a plurality of waveforms. In the embodiment presented herein, the ensemble average of plots 1930 and 2030 is of 1024 pulsed waveforms. It is to be noted how well the autocorrelation function matches the reference −35 dB Taylor window with $\bar{n}$=4, especially in the region of the mainlobe.

In the previous examples, random frequencies have been selected within the passband without regard for any prior choices. That is, each chip's frequency was chosen independent of any other chip's frequency. Consequently, for any one pulse, a particular part of the desired spectrum might be over-represented, and another part of the spectrum might be under-represented, purely as a matter of chance. Only in the aggregate of all pulses, in a statistical sense, would the desired spectrum be filled in with the appropriate shaping.

Another constraint to the randomness of chip frequencies and their energies is now considered, where each individual pulse contains chips with frequencies that within the pulse cover the entire desired passband. A NLFM stepped chirp is considered, with the chips randomly shuffled. Each pulse can be shuffled differently, but each pulse will still contain the same set of chips, identical in both frequency and duration. The instantaneous frequency of the new waveform will still have form:

$$\Omega(i,n) = \omega_n T_s + \gamma_n(T_s)^2 f(i) \qquad \text{Eqn. 10}$$

However, the quantization function of index i is now adjusted in a constrained random fashion. Based upon K total chips, with linearly increasing index −K/2≤k<K/2, a function that shuffles the index values can be defined as: $\text{Sh}_{k|n}(k)$=shuffling function that shuffles index k uniquely for pulse n.

The new sequence of quantized sample indices is then calculated as:

$$f(i) = \frac{1}{K} Sh_{k|n}(k) \qquad \text{Eqn. 11}$$

where k is the minimum integer that satisfies $$i \leq \sum_{k'=-K/2}^{k} \tau_{step, Sh_{k'|n}(k')} =$$

accumulated step length in samples, −K/2≤k<K/2, where in turn the individual chip durations can be calculated as:

$$\tau_{step,k} = \text{round}\left(\frac{I}{K} w_K(k)\right), \qquad \text{Eqn. 12}$$

which is the length of the individual frequency chips. The window taper function is defined by $w_K(k)$ which is the weighting or window taper function employed.

Accordingly, a chip's frequency can be drawn from the shuffled finite set of allowable frequencies, and the duration of that chip is still corresponding to the actual frequency drawn, specifically its position in the passband.

For the examples b=0.5, K=160 and $w_K(k)$ embodies the Taylor window function. It is to be noted that the rounding operation needs to facilitate the constraint that the sum of all steps equals the total number of waveform samples, hence:

$$\sum_{k'=-K/2}^{K/2-1} \tau_{step,k'} = I \qquad \text{Eqn. 13}$$

Figure 21:
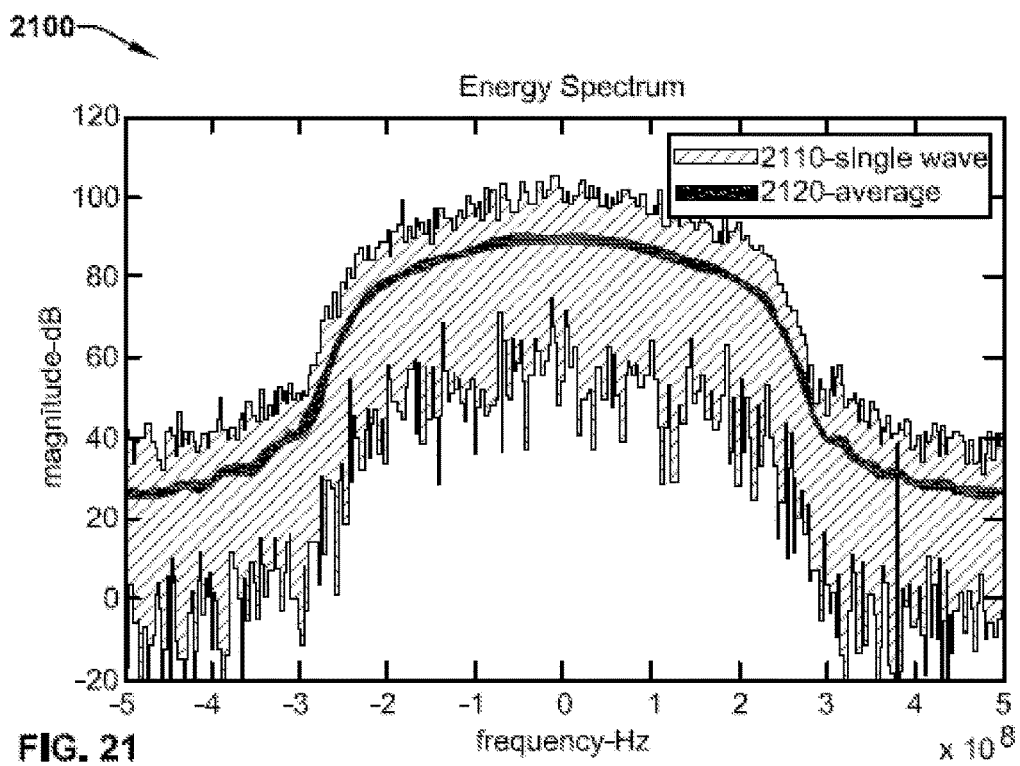
FIG. 21 illustrates an energy spectrum plot of a single pulse and an average energy spectrum formed from randomly shuffled frequency chips, according to an embodiment.
Figure 22:
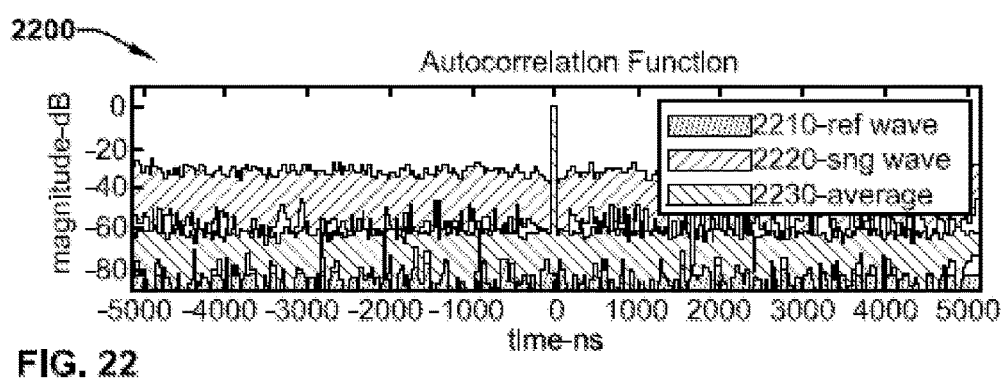
FIG. 22 presents an autocorrelation function of an energy spectrum formed from randomly shuffled frequency chips, according to an embodiment.
Figure 23:
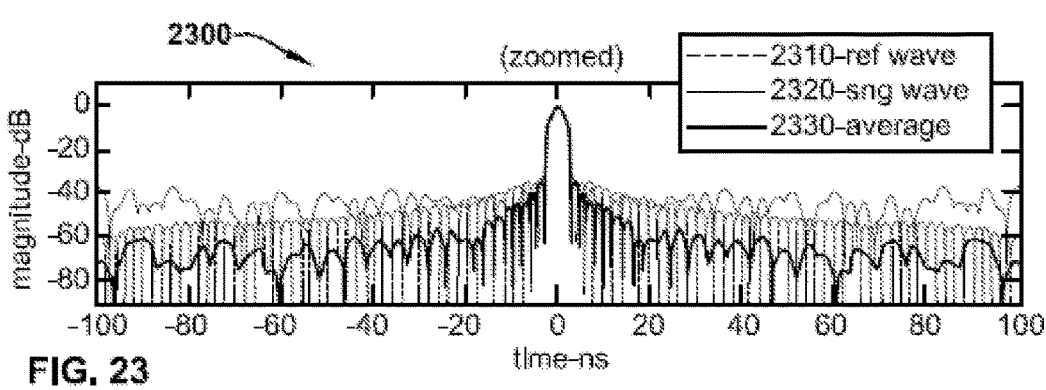
FIG. 23 illustrates a zoomed version of the central region of FIG. 22.

FIG. 21 illustrates the energy spectrum 2110 of a single pulse, and the average energy spectrum 2120 for a plurality of N pulses for a shaped spectrum utilizing an energy spectrum formed from randomly shuffled frequency chips. It is to be noted that the ensemble average energy spectrum 2120 is smoother than the curve for the single pulse 2110. FIG. 22 presents an autocorrelation function of an energy spectrum formed from randomly shuffled frequency chips, while FIG. 23 illustrates a zoomed version of the central region of FIG. 22. For comparison, a Taylor window for a desired compressed pulse response, where the reference function is a −35 dB Taylor window with $\bar{n}$=4, is also evident in FIG. 23. In FIG. 22, plot 2210 is the reference (or ideal) waveform, plot 2220 is the plot for a single waveform, and plot 2230 is the ensemble average of a plurality of waveforms, while in FIG. 23, plot 2310 is the reference (or ideal) waveform, plot 2320 is the plot for a single waveform, and plot 2330 is the ensemble average of a plurality of waveforms. In the embodiment presented herein, the ensemble average of plots 2230 and 2330 is of 1024 pulsed waveforms. It is to be noted how well the autocorrelation function matches the reference −35 dB Taylor window where $\bar{n}=4$, especially in the region of the mainlobe.

An algorithm to facilitate random selection without replacement of a frequency chip with equal likelihood of selection, as utilized to generate FIGS. 21-23, can force a particular chip frequency to appear once and only once within a pulse. The 'once' criterion facilitates formation of a complete spectrum for each pulse, as desired. However, it is to be appreciated that the 'only once' aspect can be relaxed without compromising the formation of the complete spectrum for each pulse. For example, if each chip frequency appeared exactly twice, albeit with proper duration but equal probability, then similar results would be achieved. Of course, if any chip frequency appeared, say, twice, then for a given pulse width there would need to be a corresponding reduction in the duration of any one chip, or a coarsening of the frequency quantization. These effects would have to be evaluated with respect to the IPR. Such an approach can be considered akin to choosing a card from two combined and shuffled decks, where each deck is a complete set of chip frequencies. In a further embodiment, any number of decks can be shuffled together to extend this concept. Furthermore, other variations might also be employed. For example, in an embodiment, a number of decks of integer N, (where N is an integer greater than zero) for a single pulse can be shuffled together with a random subset of an additional deck. Or, in another embodiment, a deck of frequency chips can be dealt across multiple pulses. Other combinations are also conceived based on the various embodiments presented herein.

Based on the preceding, a particular structure of random-phase waveforms can be designed in accord with the following:

(a) Each pulse is divided into two or more contiguous frames.

(b) Each frame is an independently shuffled complete deck of frequency chips.

(c) Otherwise, each deck has characteristics as defined in the last section.

Figure 24:
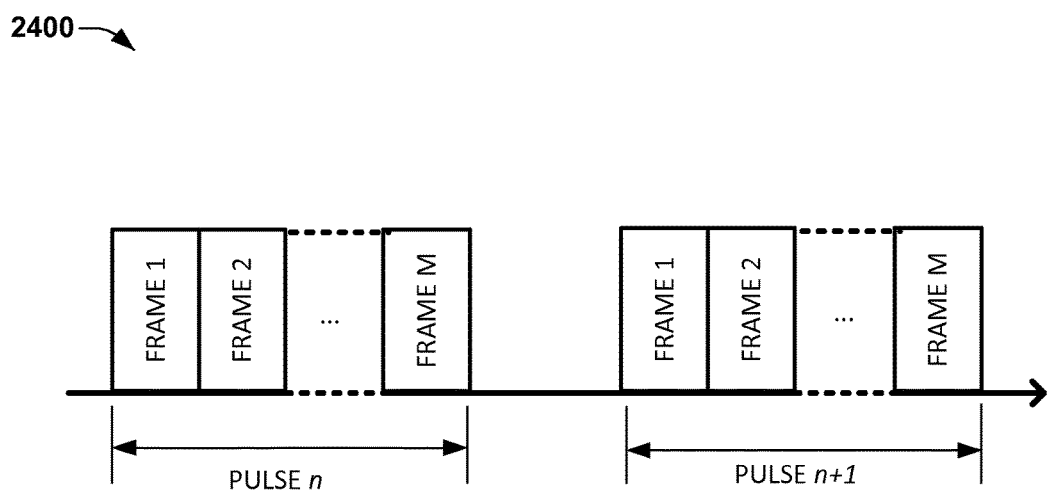
FIG. 24 illustrates a block diagram of pulses being sliced into frames, according to an embodiment.

The resulting structure is illustrated in FIG. 24, whereby the depicted embodiment can cause each frame (e.g., frame 1, frame 2, . . . frame M) to have the same spectral characteristics as the entire pulse (e.g., pulse n, pulse n+1, etc.). Such an approach enables a fraction of an entire pulse to offer the same resolution as the entire pulse. In an aspect, it may be desired that the waveform segments in individual frames do not correlate well with each other, as this would cause enhanced undesirable sidelobes in the overall waveform autocorrelation function. Furthermore, the embodiment presented in FIG. 24 may be preferred for longer pulses to mitigate quantization effects in both time duration and frequency. In an exemplary embodiment, the overall compound pulse width is T=20.48 µs but is made of two equal-length individual frames, with each frame exhibiting b=0.5, K=160, and $w_K(k)$ embodies the Taylor window function.

Figure 25:
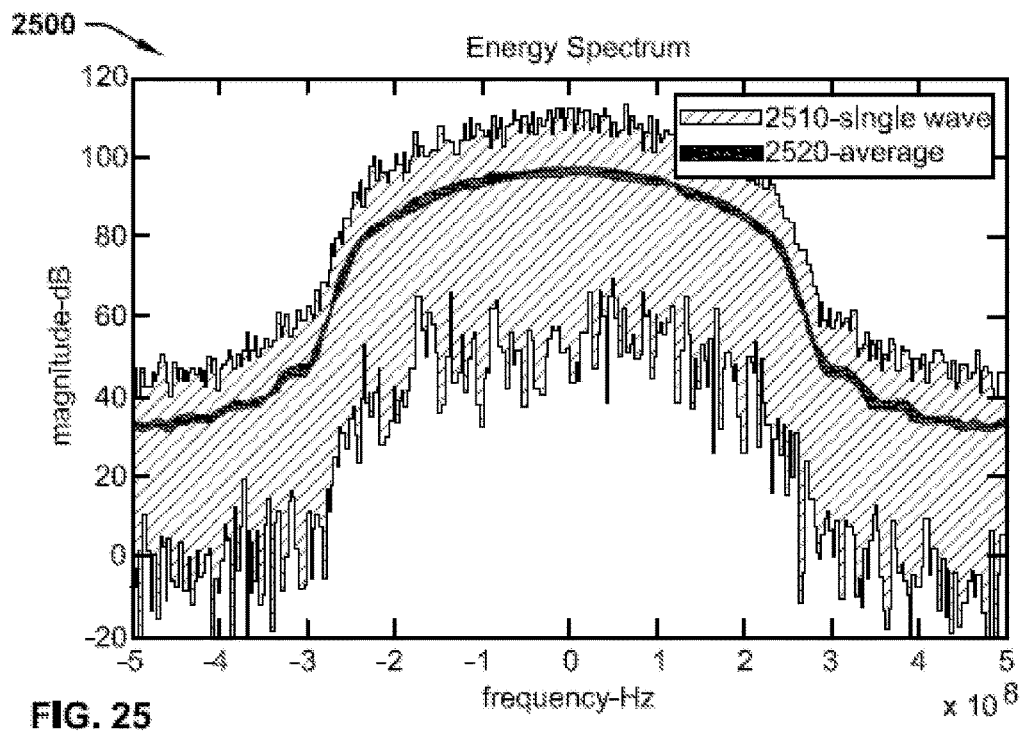
FIG. 25 illustrates an energy spectrum plot of a single pulse and an average energy spectrum formed with a compound pulse comprising two frames, according to an embodiment.
Figure 26:
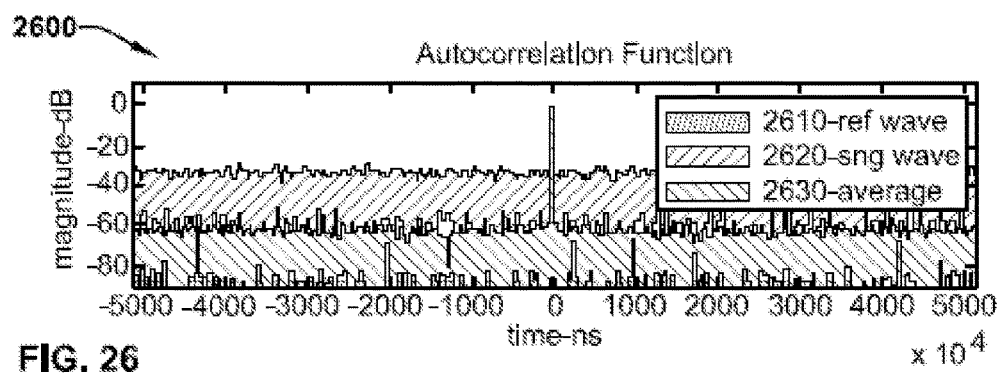
FIG. 26 presents an autocorrelation function of an energy spectrum formed with a compound pulse comprising two frames, according to an embodiment.
Figure 27:
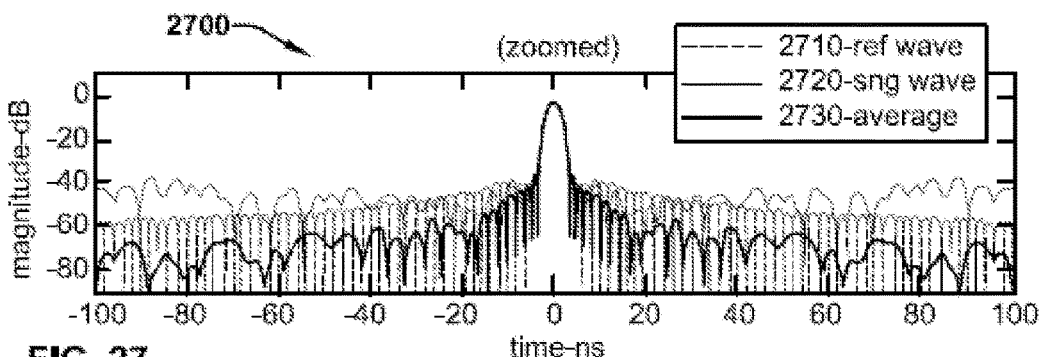
FIG. 27 illustrates a zoomed version of the central region of FIG. 26.

FIG. 25 illustrates the energy spectrum 2510 of a single pulse, and the average energy spectrum 2520 for a plurality of N pulses for an energy spectrum comprising a compound pulse generated with two frames. It is to be noted that the energy spectrum shown in FIG. 25 is generally equivalent to that presented in FIG. 21, albeit with slightly more energy because of its overall doubled length. FIG. 26 presents an autocorrelation function of an energy spectrum formed with a compound pulse comprising two frames, whereby the individual frames are shaped spectrum with randomly shuffled frequency chips, while FIG. 27 illustrates a zoomed version of the central region of FIG. 26. For comparison, a Taylor window for a desired compressed pulse response, where the reference function is a −35 dB Taylor window with $\bar{n}=4$, is also evident in FIG. 27. In FIG. 26, plot 2610 is the reference (or ideal) waveform, plot 2620 is the plot for a single waveform, and plot 2630 is the ensemble average of a plurality of waveforms, while in FIG. 27, plot 2710 is the reference (or ideal) waveform, plot 2720 is the plot for a single waveform, and plot 2730 is the ensemble average of a plurality of waveforms. In the embodiment presented herein, the ensemble average of plot 2630 is of 1024 pulsed waveforms. It is to be noted that the autocorrelation function is substantially on top of the reference IPR.

The various embodiments presented herein may be further modified or enhanced in any of a number of ways, including but not limited to the following:

(a) Individual frames need not necessarily be the same length or duration.

(b) Subsequent pulses need not contain the same number of frames.

(c) Individual frames need not have the same frequency chip set, including in either quantization, bandwidth, or spectral regions.

Figure 28:
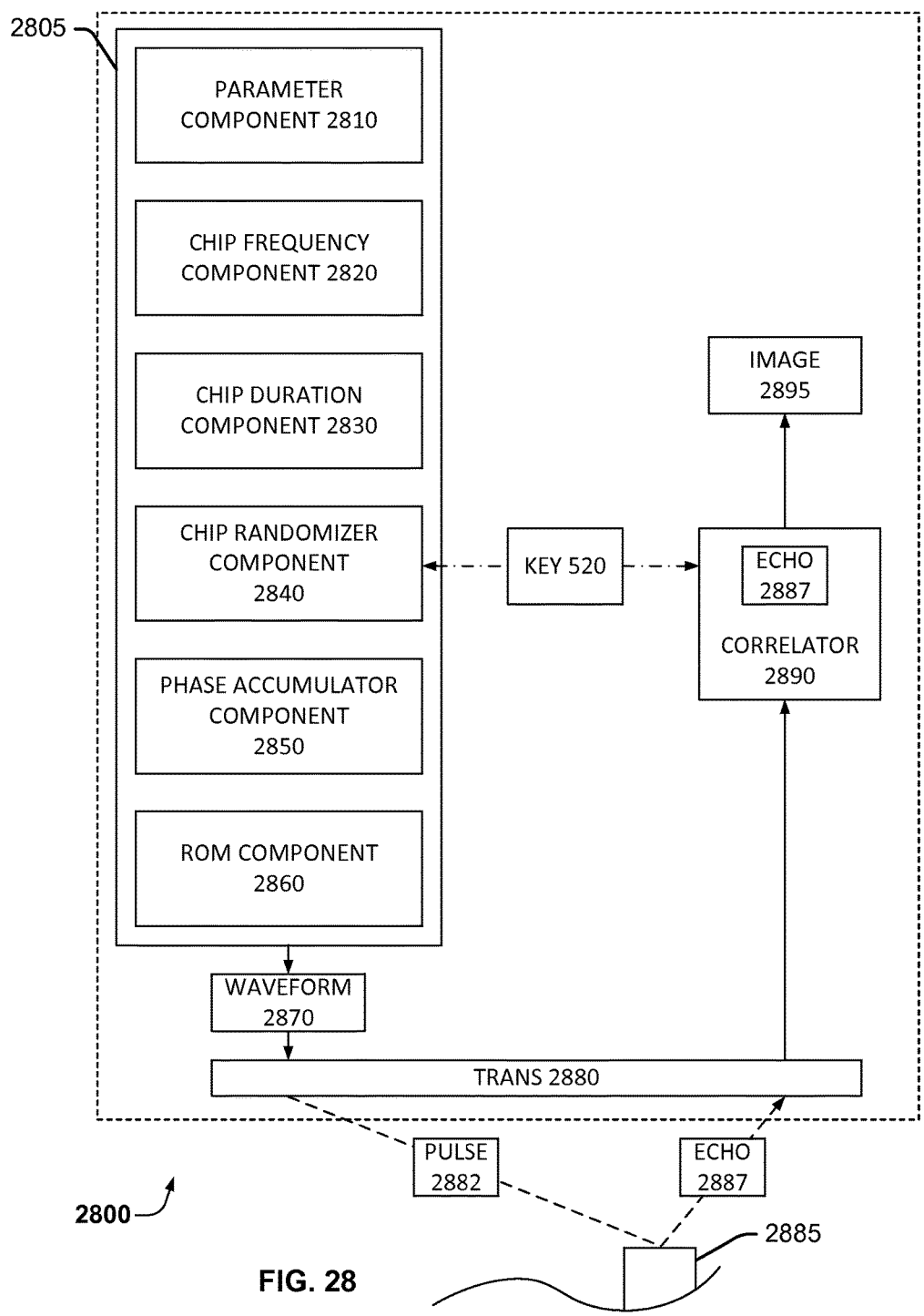
FIG. 28 illustrates a block diagram of an exemplary system which can be utilized to generate and process randomized pulsed waveforms, according to an embodiment.

FIG. 28 presents a schematic of an exemplary system 2800 which can be utilized to generate the desired waveforms in accord with one or more embodiments presented herein. System 2800 can be any suitable radar system such as a Doppler-based radar, a SAR system, etc., and can comprise of a field programmable gate array (FPGA) 2805 or other suitable component which can facilitate generation of the randomized waveforms.

A parameter component 2810 can be utilized to facilitate specification of the various waveform parameters, where such waveform parameters can include pulse width, bandwidth, number of frames, number of chips, sampling frequency, etc. It is to be noted that a chip may be as few as one sample. Based at least in part on the entered parameters, a base waveform can be generated by the parameter component 2810.

A chip frequency component 2820 can, based on the parameters entered in the parameter component 2810, determine and specify the allowable chip frequencies, e.g., as exhibiting desired waveform ESD 310, Based thereon, a frequency (or frequency range, etc.) can be assigned to each chip. For example, based upon the number of chips 320 and the desired waveform 310, the frequency for each chip can be defined to facilitate formation of the waveform with ESD 310. The chip frequencies can be selected based on the entered parameters or other applicable statistics to facilitate ESD shaping of a pulse waveform.

A chip duration component 2830 can, also based on the parameters entered in the parameter component 2810, determine and specify a required duration for each chip, for example to achieve a required energy at the frequency for the chip. Chip durations may be selected based on desired statistics to facilitate ESD shaping of a waveform (e.g., waveform ESD 310). For example, with reference to chip $C_1$ in a lower ESD region of plot 310, the duration of transmission of this chip can be maintained for a shorter time than the duration of transmission for another chip (e.g. chip $C_2$) in the higher ESD region of the plot 310.

A chip randomizer component 2840 can be utilized to randomize the chip sequence. With individual chip characteristics defined (e.g., frequency, frequency range, energy, etc.) the chips can be randomized with regard to their order, and subsequently, concatenated into a larger pulse. In some cases, specific subsets of the chips may first be concatenated into frames, and then the frames concatenated into a larger pulse. As previously described, (e.g., in FIGS. 1 and 5) a key or seed 520 can be generated, whereby the random sequence is based upon the key 520. In an embodiment, the chip randomizer component 2840 can be a pseudo-random code generator.

Once the frequencies have been chosen for each sample time for each pulse, a phase accumulator component 2850 can be utilized to accumulate the frequencies within a pulse to provide a phase function of sample index.

A read-only-memory (ROM) component 2860 can be utilized to convert the phase samples into amplitudes. In an embodiment, ROM component 2860 can be a lookup table which can contain a cycle of a sine waveform, a cosine waveform, or portions thereof in an embodiment, the conversion can utilize both sine and cosine functions of the phase for quadrature outputs (single-sideband mixing), or in another embodiment, one of sine or cosine functions of the phase can be utilized for single-ended output (double-sideband mixing).

As shown in FIG. 28, one, or a plurality of, pulse waveform(s) 2870 generated in accord with one or more embodiments presented herein can be subsequently forwarded to a transceiver component 2880 for transmission. The transmitted pulse(s) 2882 are reflected off the target, with echo pulses 2887 received at transceiver component 2880 for subsequent radar processing. As shown, at the appropriate reference time, a copy of the transmitted waveform 2870 is regenerated originating with the same key 520 used to form the transmitted waveform. This copy is the reference waveform for a correlator 2890, whereby a received echo pulse 2887 is processed and compressed to form a radar image 2895. It is to be appreciated that while transceiver component 2880 is depicted as a single component performing transmitting and receiving operations, the transceiver component 2880 can comprise of separate components, a first component associated with transmission of a radar pulse and a second component associated with reception of an echo pulse.

Figure 29:
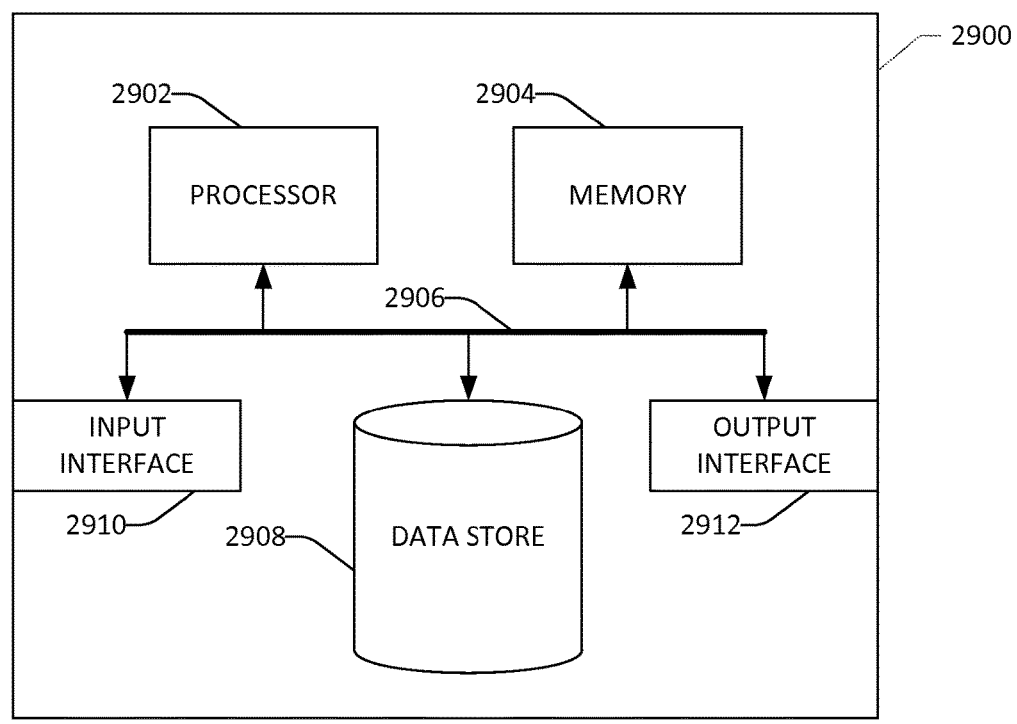
FIG. 29 illustrates an exemplary computing device.

Referring now to FIG. 29, a high-level illustration of an exemplary computing device 2900 that can be used in accordance with the systems and methodologies disclosed herein is illustrated. For instance, the computing device 2900 may be utilized to perform any of the functions presented herein relating to the various embodiments, where such functions can include deriving waveform parameters, receiving parameter input, determining chip frequency, determining chip duration, generation of a randomization key, retrieval and application of a randomization key, randomization of the waveform, processing of the waveform, etc. The computing device 2900 includes at least one processor 2902 that executes instructions that are stored in a memory 2904. The instructions may be, for instance, instructions for implementing functionality described as being carried out by one or more components discussed above or instructions for implementing one or more of the methods described above. The processor 2902 may access the memory 2904 by way of a system bus 2906. In addition to storing executable instructions, the memory 2904 may also store operating parameters, required operating parameters, and so forth.

The computing device 2900 additionally includes a data store 2908 that is accessible by the processor 2902 by way of the system bus 2906. The data store 2908 may include executable instructions, operating parameters, required operating parameters, etc., such as waveform parameters, randomization key(s), etc. The computing device 2900 also includes an input interface 2910 that allows external devices to communicate with the computing device 2900. For instance, the input interface 2910 may be used to receive instructions from an external computer device, from a user, etc. The computing device 2900 also includes an output interface 2912 that interfaces the computing device 2900 with one or more external devices. For example, the computing device 2900 may display text, images, etc., by way of the output interface 2912, e.g., a radar image.

Additionally, while illustrated as a single system, it is to be understood that the computing device 2900 may be a distributed system. Thus, for instance, several devices may be in communication by way of a network connection and may collectively perform tasks described as being performed by the computing device 2900.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. The terms "component" and "system" are also intended to encompass hardware configured to cause certain functionality to be performed, where such hardware can include, but is not limited to including, Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

What has been described above includes examples of one or more embodiments. It is, of course, not possible to describe every conceivable modification and alteration of the above structures or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method performed at a radar system, the method being for generating a randomized radar pulse waveform, the method comprising:
  determining, at a processing component of the radar system, a waveform spectrum profile, the determining being based on at least one parameter;
  assigning, at the processing component, sample frequencies of the waveform spectrum profile to a set of chips;
  configuring, at the processing component, an order of chips in the set of chips based upon a randomization key to form a randomized sequence of chips; and
  transmitting a pulse signal having a waveform that is based upon the randomized sequence of chips, the signal transmitted from a transceiver of the radar system.

2. The method of claim 1, wherein a frequency width spacing of a first chip in the set of chips is equal to the frequency width spacing of a second chip in the set of chips.

3. The method of claim 1, wherein a frequency width spacing of a first chip in the set of chips is disparate to the frequency width spacing of a second chip in the set of chips.

4. The method of claim 1, wherein the randomization key is a pseudo-random code.

5. The method of claim 1, further comprising controlling, at the processing component, a duration of transmission of a chip in the randomized sequence of chips to facilitate achieving a desired energy for the chip.

6. The method of claim 1, further comprising:
  receiving, at the transceiver, an echo pulse, wherein the echo pulse is based at least in part on an interaction between the pulse signal and a target;
  comparing, at the processing component, the echo pulse to a copy of the transmitted pulse signal; and
  based at least in part on the comparing of the echo pulse to a copy of the transmitted pulse signal, determining, at the processing component, at least one characteristic of the target.

7. The method of claim 1, wherein an energy spectral density of the transmitted pulse signal is equal to one of a linear frequency modulated chirp, a non-linear frequency modulated chirp, a stepped frequency profile chirp, a phase-coded modulation profile chirp, a random noise waveform chirp, or a pseudo-random noise waveform chirp.

8. A radar system comprising:
  a chip frequency component configured to slice a radar waveform into a plurality of chips, wherein the plurality of chips have an original sequence;
  a chip randomizer component configured to re-sequence the original sequence of chips into a randomized sequence of chips; and
  a phase accumulator component configured to accumulate frequencies of the randomized sequence of chips to facilitate production of a phase function for each chip in the randomized sequence of chips.

9. The system of claim 8, further comprising a read-only-memory (ROM) component configured to convert the phase function for each chip in the randomized sequence of chips into an amplitude to facilitate generation of a transmittable pulse.

10. The system of claim 8, further comprising a randomization key, wherein the randomization key is utilized by the chip randomizer component to facilitate generation of a randomized sequence of chips.

11. The system of claim 10, wherein the randomization key is one of a randomly generated code or a code retrieved from a database.

12. The system of claim 8, further comprising a transceiver configured to transmit a pulse, wherein the pulse comprises the randomized sequence of chips.

13. The system of claim 12, wherein the transceiver is further configured to receive an echo pulse, wherein the echo pulse is a reflection, from a target, of the transmitted pulse.

14. The system of claim 13, further comprising a correlator component configured to compare the echo pulse to the transmitted pulse.

15. The system of claim 14, the correlator component further configured to measure at least one target characteristic based on comparing the echo pulse with the transmitted pulse.

16. The system of claim 8, wherein the radar waveform's original sequence is one of a linear frequency modulated chirp, a non-linear frequency modulated chirp, a stepped frequency profile chirp, a phase-coded modulation profile chirp, a random noise waveform chirp, or a pseudo-random noise waveform chirp.

17. A method for utilizing a randomized radar pulse waveform at a radar system, the method comprising:
  at a processing component of the radar system:
    slicing a waveform into an original sequence of chips;
    obtaining a randomization key; and
    randomizing the sequence of chips with the randomization key to form a transmittable pulse comprising a randomized sequence of chips;
  at a transceiver of the radar system:
    transmitting the pulse; and
    receiving an echo pulse, wherein the echo pulse is based at least in part on an interaction of the transmitted pulse and a target;
  responsive to receiving the echo pulse, and at the processing component of the radar system:
    comparing the echo pulse with the transmitted pulse; and
    determining at least one target characteristic based at least in part on comparing an energy of a first chip in the transmitted sequence of chips with an energy of the first chip in the sequence of chips derived from the echo pulse.

18. The method of claim 17, wherein the randomization key is one of a randomly generated code or a code obtained from a database.

19. The method of claim 17, further comprising controlling, at the processing component, a duration of transmission of a chip in the randomized sequence of chips to facilitate achieving a required energy for the chip.

20. The method of claim 17, wherein a frequency sample spacing of a first pair of frequency samples in the energy spectrum of a waveform is equal to the frequency sample spacing of a second pair of frequency samples in the energy spectrum of the waveform, or the frequency sample spacing of a first pair of frequency samples in the energy spectrum of the waveform is disparate to a second pair of frequency samples in the energy spectrum of the waveform.

* * * * *